United States Patent
Meij et al.

(10) Patent No.: US 10,289,957 B2
(45) Date of Patent: May 14, 2019

(54) METHOD AND SYSTEM FOR ENTITY LINKING

(71) Applicant: Yahoo! Inc., Sunnyvale, CA (US)

(72) Inventors: Edgar Meij, Barcelona (ES); Roi Blanco, Barcelona (ES); Giuseppe Ottaviano, Pisa (IT)

(73) Assignee: EXCALIBUR IP, LLC, Sunnyvale, CA (US)

( * ) Notice: Subject to any disclaimer, the term of this patent is extended or adjusted under 35 U.S.C. 154(b) by 90 days.

(21) Appl. No.: 14/585,315

(22) Filed: Dec. 30, 2014

(65) Prior Publication Data

US 2016/0189047 A1    Jun. 30, 2016

(51) Int. Cl.
G06N 5/04       (2006.01)
G06N 7/00       (2006.01)
G06F 17/24      (2006.01)
G06F 17/27      (2006.01)
G06F 17/30      (2006.01)

(52) U.S. Cl.
CPC .......... G06N 7/005 (2013.01); G06F 17/241 (2013.01); G06F 17/278 (2013.01); G06F 17/30657 (2013.01); G06F 17/30864 (2013.01); Y04S 10/54 (2013.01)

(58) Field of Classification Search
CPC ............. G06N 5/02; G06N 5/04; G06N 5/048
USPC .......................................................... 706/45
See application file for complete search history.

(56) References Cited

U.S. PATENT DOCUMENTS

| 8,161,059 B2 | 4/2012 | Guo et al. |
| 8,589,399 B1 | 11/2013 | Lee et al. |
| 2014/0279324 A1* | 9/2014 | King .................... G06Q 30/04 705/34 |
| 2014/0346096 A1* | 11/2014 | Felse ......................... B07C 3/10 209/584 |

OTHER PUBLICATIONS

Hoxha et al ("Learning Relevance of Web Resources across Domains to make Recommendations" Dec. 4-7, 2013).*
Meij et al ("Entity Linking and Retrieval" Aug. 2013).*
Wang et al ("Entity Linking from Microblogs to Knowledge Base Using ListNet Algorithm" 2013).*

* cited by examiner

Primary Examiner — Lut Wong
(74) Attorney, Agent, or Firm — Pillsbury Winthrop Shaw Pittman LLP

(57) ABSTRACT

The present teaching relates to entity linking. In one example, a text string is received. The text string is segmented to obtain a segmentation with a set of one or more segments of the text string. A set of entities are identified, with respect to the one or more segments, from a plurality of entities as linked to the one or more segments. The identifying is in accordance with a probabilistic model based on surface form information associated with the plurality of entities.

28 Claims, 18 Drawing Sheets

FIG. 12

METHOD AND SYSTEM FOR ENTITY LINKING

BACKGROUND

1. Technical Field

The present teaching relates to methods, systems, and programming for entity linking and utilization thereof.

2. Discussion of Technical Background

Commercial web search engines are presenting increasingly advanced results that include rich displays of answers, facts, entities, and other structured results such as ratings and prices. These richer user experiences are centered around understanding and displaying information around entities presented in web search queries. More and more, users want to find the actual answers and/or entities that satisfy their information need, rather than merely the documents that mention them. One step in this process is to understand which entities are mentioned in the query in order for the search engine to be able to fire actions that involve the entities and query intents. This entity linking (also known as disambiguation) has to be performed within a very limited time budget, as it needs to happen before the actual search process commences.

None of the existing entity linking approaches deals with the problem of linking entities in the shortest amount of time possible, nor they introduce richer semantic contexts. Most existing entity linking approaches assume that the input text is relatively clean and grammatically correct and that it provides sufficient context for the purposes of identifying entities. Queries, on the other hand, are short, noisy, and full of shorthand and other ungrammatical text, and provide very limited context for the words they contain. Hence, known entity detection approached designed for news articles or web pages do not perform well on short text strings, e.g., queries. On the other hand, the efficiency aspect of current entity linking systems has not been evaluated so far on a large corpus of queries. Entity linking in queries poses some technical challenges, because of the sheer volume of the data, its dynamic nature, the creative language usage, and the required tradeoff between speed and disambiguation quality.

Therefore, there is a need to provide an improved solution for entity linking to solve the above-mentioned problems.

SUMMARY

The present teaching relates to methods, systems, and programming for entity linking and utilization thereof.

In one example, a method implemented on a computing device having at least one processor, storage, and a communication platform connected to a network for entity linking is disclosed. A text string is received. The text string is segmented to obtain a segmentation with a set of one or more segments of the text string. A set of entities are identified, with respect to the one or more segments, from a plurality of entities as linked to the one or more segments. The identifying is in accordance with a probabilistic model based on surface form information associated with the plurality of entities.

In another example, a method implemented on a computing device having at least one processor, storage, and a communication platform connected to a network for providing search results is disclosed. A query is received. The query is segmented into one or more segments each of which includes at least some text. A set of entities are determined, with respect to the one or more segments, from a plurality of entities as linked to the one or more segments. The identifying is in accordance with a probabilistic model based on surface form information associated with the plurality of entities. Content sources associated with the set of entities linked to the one or more segments are identified. Search results are identified from the content sources based on the query. The search results are provided as a response to the query.

In a different example, a system for entity linking is disclosed. The system includes a segmenting module and an entity identifying module. The segmenting module is configured to segment a text string to obtain a segmentation with a set of one or more segments of the text string. The entity identifying module is coupled with the segmenting module and configured to identify, with respect to the one or more segments, a set of entities from a plurality of entities as linked to the one or more segments. The identifying is in accordance with a probabilistic model based on surface form information associated with the plurality of entities.

Other concepts relate to software for implementing the present teaching on entity linking. A software product, in accord with this concept, includes at least one non-transitory machine-readable medium and information carried by the medium. The information carried by the medium may be executable program code data, parameters in association with the executable program code, and/or information related to a user, a request, content, or information related to a social group, etc.

In one example, a non-transitory machine readable medium having information recorded thereon for entity linking is disclosed. The recorded information, when read by the machine, causes the machine to perform a series of processes. A text string is received. The text string is segmented to obtain a segmentation with a set of one or more segments of the text string. A set of entities are identified, with respect to the one or more segments, from a plurality of entities as linked to the one or more segments. The identifying is in accordance with a probabilistic model based on surface form information associated with the plurality of entities.

Additional features will be set forth in part in the description which follows, and in part will become apparent to those skilled in the art upon examination of the following and the accompanying drawings or may be learned by production or operation of the examples. The features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 12 depicts exemplary tables of probabilistic scores, according to an embodiment of the present teaching;

DETAILED DESCRIPTION

Figure 1:
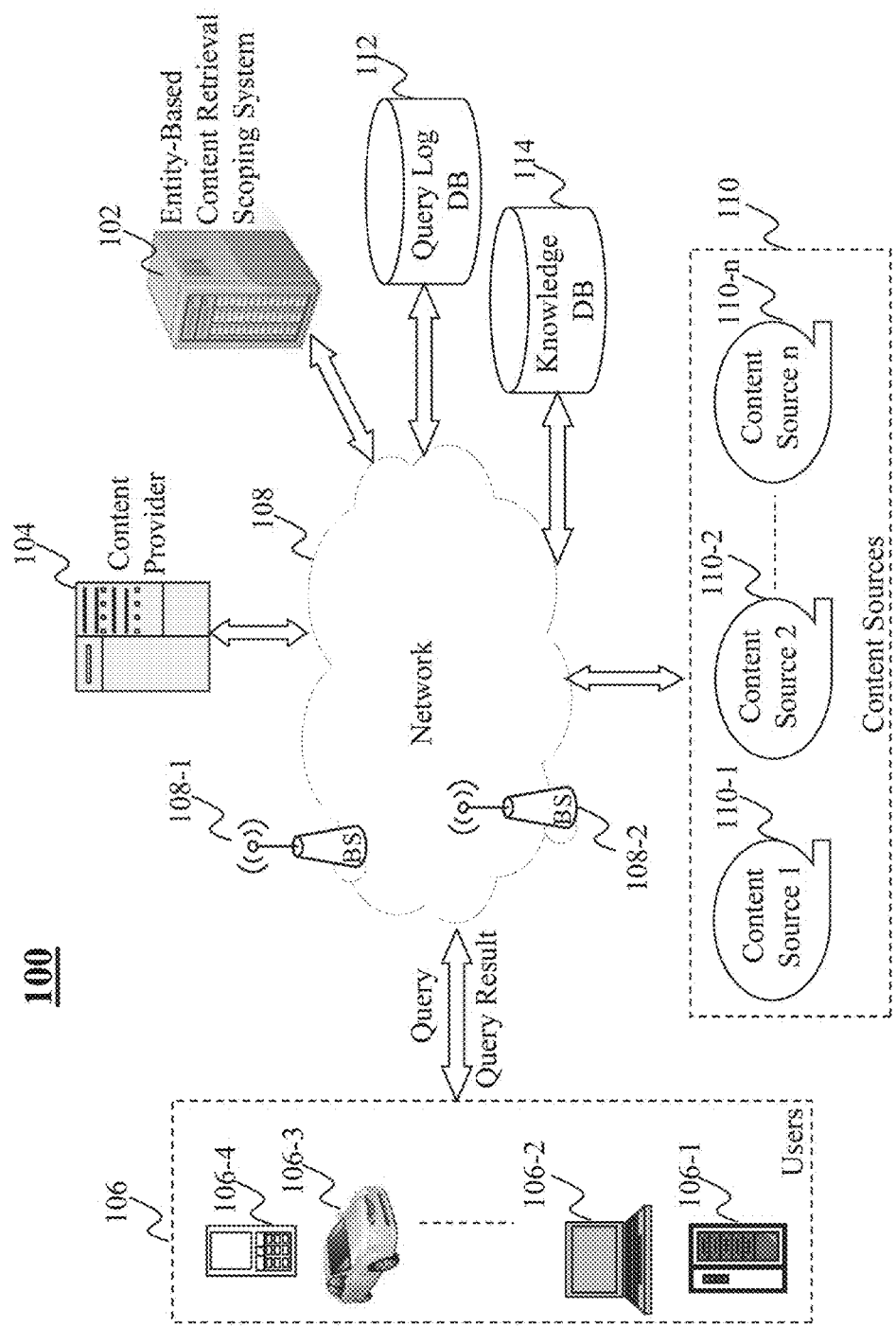
FIGS. 1-2 illustrate exemplary system configurations in which an entity-based content retrieval scoping system can be deployed, according to various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective entity linking, which can be realized as a specialized and networked system by utilizing one or more computing devices (e.g., mobile phone, personal computer, etc.) and network communications (wired or wireless). The method and system as disclosed herein utilize a new probabilistic model for entity linking in queries that makes use of information mined from query logs and the hyperlink structure of the Web. The method and system in the present teaching can extract a large number of candidate surface forms (also known as aliases) from click-through information and anchor text, i.e., every query or anchor that clicks/points to a corresponding knowledge database entry (e.g., a Wikipedia page). The probabilistic model in the present teaching can be combined with a dynamic programming approach to generate the best entity segmentation of the query, thereby further reducing the processing time.

The method and system in the present teaching are able to detect swiftly the entities presented in the query by maximizing the amount of data exposed to the model and at the same time reducing its number of parameters. For example, the method and system in the present teaching may rely on user-generated content in the Web, namely anchor text and queries submitted to a search engine (query logs) to establish a connection between an entity and a surface form if there is an actual user link from either anchor text or a user query leading to a click into the web page that represents the entity. The method and system may segment the received text string, e.g., a query, and, at the same time, select the right entity for each one of its segments. In some embodiments of the present teaching, the system and method perform this task by computing a probabilistic score for each segment, and then by optimizing the score of the whole query. In some embodiments of the present teaching, the method and system refrain from employing any supervision and let the model and data operate in a parameterless fashion.

Moreover, the method and system in the present teaching may further utilize a new contextual relevance model that takes into consideration of the context of the received text string, e.g., the whole query, in order to select more relevant entities linked to the received text string. For example, the contextual relevance model may use learned vector representations of query words and entities, and thus is able to compute quickly a relevance measure between a string of text and an entity. In some embodiments, the method and system in the present teaching aggregate vectors that encode word distributional semantics, and factored in the model the similarity of entity and query vectors.

Figure 2:
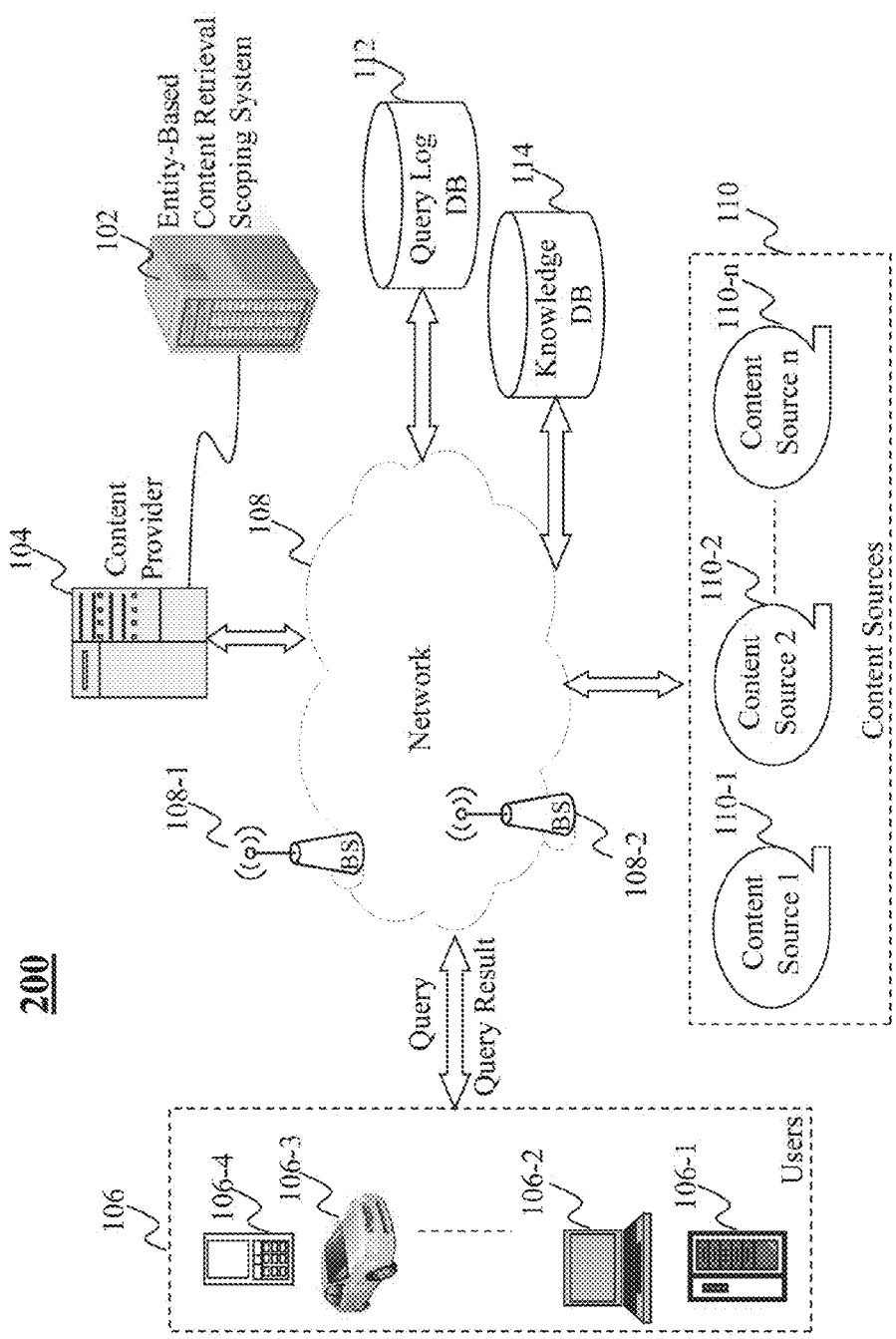

FIGS. 1-2 illustrate exemplary system configurations in which an entity-based content retrieval scoping system can be deployed, according to various embodiments of the present teaching. In FIG. 1, the exemplary system configuration 100 includes the entity-based content retrieval scoping system 102, a content provider 104, users 106, a network 108, content sources 110, a query log database 112, and a knowledge database 114.

The network 108 may be a single network or a combination of different networks. For example, a network may be a local area network (LAN), a wide area network (WAN), a public network, a private network, a proprietary network, a Public Switched Telephone Network (PSTN), the Internet, a wireless network, a cellular network, a virtual network, or any combination thereof. A network may also include various network access points, e.g., wired or wireless access points such as base stations or Internet exchange points 108-1, . . . , 108-2, through which a data source may connect to the network 108 in order to transmit information via the network 108, and a network node may connect to the network 108 in order to receive information.

The content provider 104 may be a publisher, a search engine, a content portal, or any other sources by which content can be provided. The content provider 104 corresponds to an individual, a firm, or an organization, publishing or supplying content, including a blogger, television station, a newspaper issuer, a web page host, a content portal, an online service provider, or a game server. The content provider 104 may receive text strings, such as queries, and return content related to the text strings, such as query results. In this example, before the content provider 104 starts to retrieve content, entities in the queries are recognized by the entity-based content retrieval scoping system 102 based on a novel probabilistic model and surface form information mined from the query log database 112 and/or knowledge database 114. Based on the linked entities, the entity-based content retrieval scoping system 102 may also identify appropriate content sources from which the query results/content should be retrieved. The linked entities and/or the identified content sources are then provided to the content provider 104 for various applications, such as vertical search, query recommendation, or video search.

The "entities" referred in the present teaching may be things each of which has a distinct and independent existence. For example, an entity may be represented as a phrase that identifies one item from a set of other items that have similar attributes, such as proper nouns or common names acting as proper nouns. Examples of entities include names of persons, organizations, locations, products, movies, etc. The "surface forms" (also known as alias) referred in the present teaching may be any information that is indicative of an entity, such as anchor text (hypertext) linked to a web page representing the entity or a query that has led to a click to the web page representing the entity. For example, "iPhone" may be an entity, which is represented by a web page such as the official web page of "iPhone" at apple.com or the Wikipedia page of "iPhone." The surface forms of the entity "iPhone" then may include anchor text (e.g., the hypertext "iPhone") or any user-submitted queries that have led to a click to the web page of "iPhone," e.g., "iphone 5s," "iphone 6," "apple's smartphone," etc.

In order to gather the surface forms of various entities, the entity-based content retrieval scoping system 102 may access information stored in the query log database 112 and/or the knowledge database 114 via the network 108. The information in the query log database 112 and knowledge database 114 may be generated by one or more different applications (not shown), which may be running on the content provider 104 and/or the entity-based content retrieval scoping system 102, at the backend of the content provider 104 and/or the entity-based content retrieval scoping system 102, or as a completely standalone system capable of connecting to the network 108, accessing information from different sources, analyzing the information, generating structured information, and storing such generated information in the query log database 112 and knowledge database 114.

The users 106 may be of different types such as users connected to the network 108 via desktop connections (106-1), users connecting to the network 108 via wireless connections such as through a laptop (106-2), a handheld device (106-4), or a built-in device in a mobile vehicle such as a motor vehicle (106-3). The users 106 may be connected to the network 108 and able to send queries to the content provider 104 and receive query results from the content provider 104.

The content sources 110 include multiple content sources 110-1, 110-2, . . . , 110-*n*, such as vertical content sources (domains). A content source 110 may correspond to a website hosted by an individual, a business, or an organization such as USPTO.gov, a content provider such as cnn.com and Yahoo.com, a social network website such as Facebook.com, or a content feed source such as tweeter or blogs. The content provider 104 may access information from any of the content sources 110-1, 110-2, . . . , 110-*n*. For example, the content provider 104 may fetch content, e.g., web pages, through its web crawler to build a search index.

As mentioned above, once the entities are recognized from the received queries by the entity-based content retrieval scoping system 102, the entity-based content retrieval scoping system 102 may further identify one or more content sources based on the linked entities. The content provider 104 then may perform vertical search within the identified content sources based on the received queries.

FIG. 1 shows the system configuration 100 in which the entity-based content retrieval scoping system 102 serves as an independent service provider in relation to the content provider 104. In this configuration, the entity-based content retrieval scoping system 102 can be connected to a plurality of content providers and facilitate entity linking as a service to any content provider. FIG. 2 presents a slightly different system configuration 200 in which the entity-based content retrieval scoping system 102 is coupled to the content provider 104 as a backend sub-system. In this configuration, the entity-based content retrieval scoping system 102 as shown is used only by the content provider 104 in operation.

Figure 3:
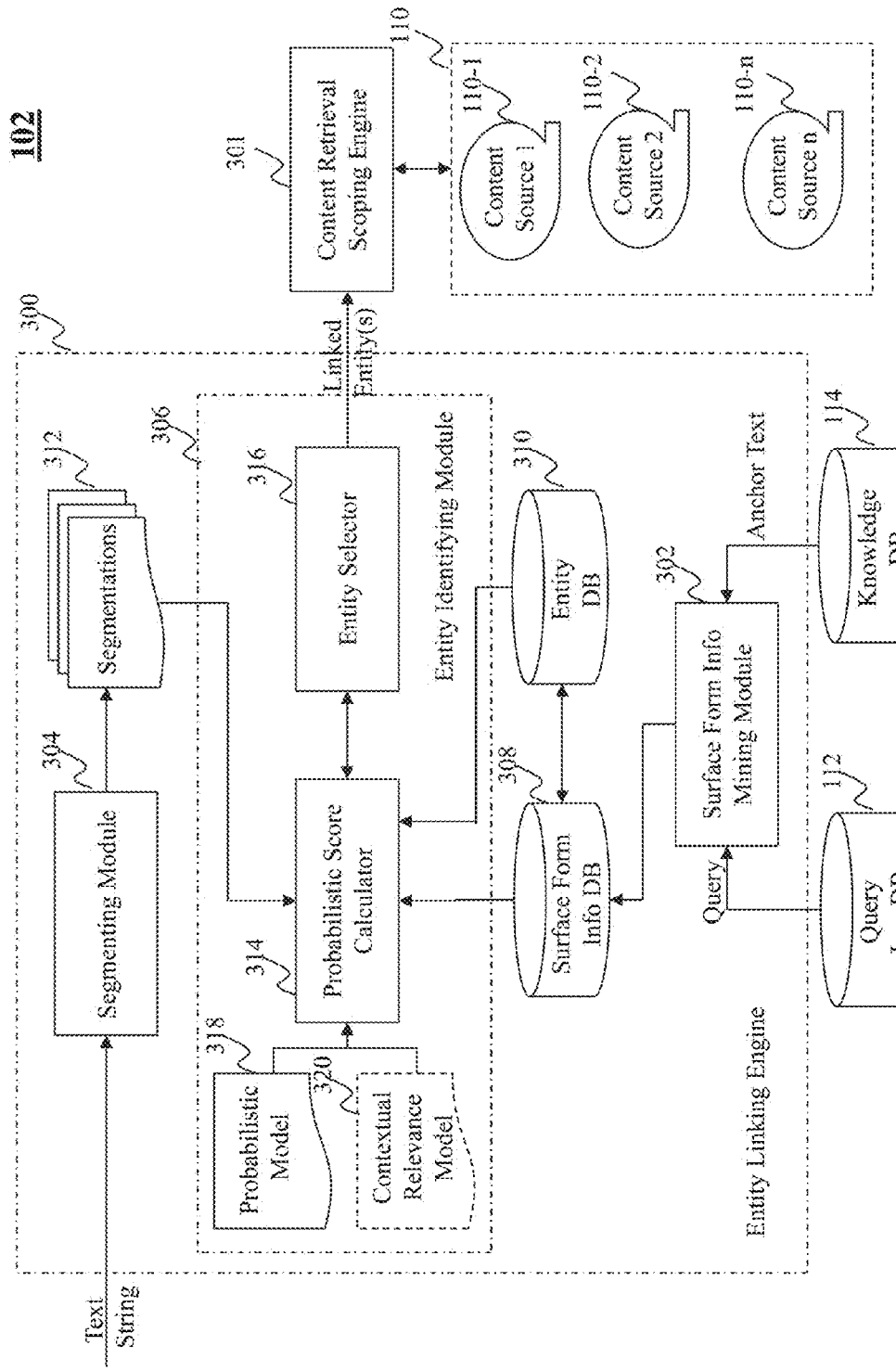
FIG. 3 is a high level exemplary system diagram of an entity-based content retrieval scoping system having an entity linking engine, according to an embodiment of the present teaching.

FIG. 3 is a high level exemplary system diagram of an entity-based content retrieval scoping system having an entity linking engine, according to an embodiment of the present teaching. The entity-based content retrieval scoping system 102 in this embodiment includes an entity linking engine 300 and a content retrieval scoping engine 301. The entity linking engine 300 links the received text string to entities by segmenting the text string into segments and identifying a set of entities linked to the segments in accordance with a probabilistic model based on surface form information associated with the entities. In some embodiments, the entity linking engine 300 may utilize the context of the text string, e.g., the whole query, as well to further disambiguate the candidate entities. The content retrieval scoping engine 301 receives the linked entities identified by the entity linking engine 300 and determines the scope in which the subsequent content retrieval operation, e.g., vertical search, is performed. For example, the content retrieval scoping engine 301 may select one or more content sources 110 based on the linked entities. In one example, if the linked entity is determined as a product (e.g., "iPhone"), then the content retrieval scoping engine 301 may select a "product review database" and a "product price database" for this entity so that the corresponding search results will focus on the customer review and price comparison of iPhone. In addition to content sources, the content retrieval scoping engine 301 may also determine the presentation styles suitable for the linked entities. For example, if the linked entity is a celebrity, then the content retrieval scoping engine 301 may determine that the pictures of the celerity should be arranged on top of the results page.

The entity linking engine 300 in this embodiment includes a surface form information mining module 302, a segmenting module 304, and an entity identifying module 306. The surface form information mining module 302 is configured to obtain surface form information from various sources, e.g., the query log database 112 and the knowledge database 114. The query log database 112 contains user-generated information related to user actions in online search, including queries submitted by users and the web pages clicked by the users. As mentioned above, an entity may be represented by one or more web pages, e.g., the entity of "iPhone" can be represented by its Wikipedia page or its official product page at apple.com. The surface form information mining module 302 may identify all the user-submitted queries that have led to a click to any of the web pages representing a particular entity. In the above "iPhone" example, the queries may be "iphone 5s," "iphone 6," or "apple's smartphone."

Those queries become part of the surface forms of entities. In addition to user-submitted queries, the surface form information mining module 302 may also identify anchor text linked to each of the web pages representing an entity. The anchor text may be hypertext on any pages in a knowledge database 114. The knowledge database 114 may be any entity repositories, for example, Wikipedia, IMDB.com, amazon.com, Freebase, etc. In the above "iPhone" example, any hypertext on any Wikipedia page that links to the "iPhone" Wikipedia page may be identified by the surface form information mining module 302 as part of the surface forms, i.e., anchor text. All the surface form information may be stored in a surface form information database 308 and indexed with each entity in an entity collection stored in an entity database 310.

The segmenting module 304 in this embodiment is configured to receive a text string, e.g., a query submitted by a user, and segment the text string to obtain one or more segmentations 312. Each of the segmentation results in a set of segments of the text string. For example, a user query "buy iphone 6" may be segmented into various segmentations, such as "buy"+"iphone 6, " "buy"+"iphone"+"6," "buy iphone"+"6," etc. Each segmentation includes one or more segments of the text string. In some embodiments, all the segmentations and the segments thereof are fed into the entity identifying module 306. In some embodiments, a dynamic programming approach may be applied by the segmenting module 304 to select the one or more suitable entity segmentations of the text string and fed only the selected entity segmentations to the entity identifying module 306. In the example mentioned above, the segmenting module 304 may select "buy"+"iphone 6" as the best entity segmentation.

The entity identifying module 306 in this embodiment includes a probabilistic score calculator 314 and an entity selector 316. The probabilistic score calculator 314 is responsible for calculating, for each segment of the text string with respect to each entity stored in the entity database 310, a probabilistic score $P(e|s)$ for the segment based on the surface form information associated with the entity that is retrieved from the surface form information database 308. The probabilistic score $P(e|s)$ is indicative of a likelihood that entity e is a linked entity given segment s. The calculation of the probabilistic score is in accordance with a probabilistic model 318, which will be described later in details. In this embodiment, in addition to the probabilistic model 318, a contextual relevance model 320 may also be applied by the probabilistic score calculator 314 for calculating a context sensitive probabilistic score for each entity. The context sensitive probabilistic score is indicative of a likelihood that the entity is linked to a segment given the context of the text string. For example, the context of the text string may be all the words in the text string, e.g., the whole query. The context sensitive probabilistic score may be used to adjust the basic probabilistic score for each segment to take into account of the relevance between an entity and the context of the text string. It is understood that in some embodiments, the contextual relevance model 320 may not be necessary.

The entity selector 316 receives all the probabilistic scores, either adjusted scores based on context sensitive probabilistic scores or the basic probabilistic scores, and identifies, with respect to the segments of one segmentation, a set of entities from all the entities stored in the entity database 310. The identification may be performed by maximizing aggregated probabilistic scores associated with all the segments or by maximizing one of the probabilistic scores associated with one of the segments (e.g., with respect to the top-ranked entity). The identified set of entities, i.e., the linked entities, are then provided to the content retrieval scoping engine 301 for determining the content sources where content related to the text string can be retrieved.

Figure 4:
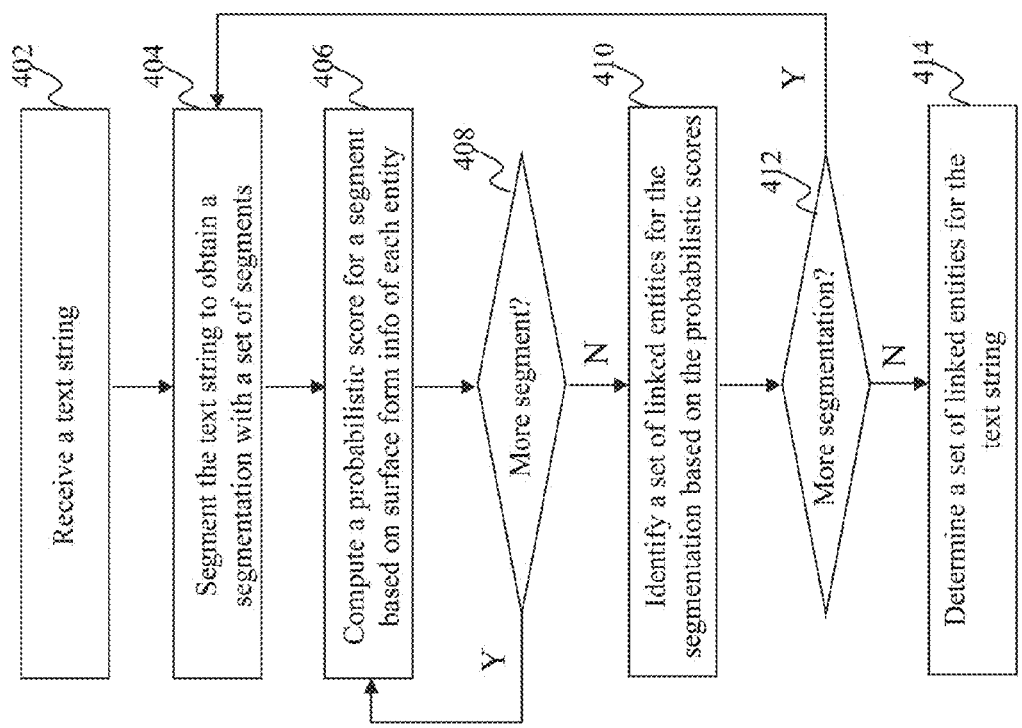
FIG. 4 is a flowchart of an exemplary process for an entity linking engine, according to an embodiment of the present teaching.

FIG. 4 is a flowchart of an exemplary process for an entity linking engine, according to an embodiment of the present teaching. Starting at 402, a text string is received. The text string may be, for example, a search query. At 404, the text string is segmented to obtain a segmentation with a set of segments of the text string. At 406, a probabilistic score is computed for one of the segments with respect to each entity based on surface form information associated with the entity. At 408, whether there are more segments for which their probabilistic scores have not been computed yet is determined. If the answer is yes, then the process returns to 406 to compute the probabilistic scores of the next segment with respect to each entity. Once the probabilistic scores of all the segments of this segmentation are computed, the process continues to 410 where a set of linked entities are identified based on the probabilistic scores of all the segments of the segmentation. At 412, whether all the possible segmentations of the text string have been processed is checked. If there are more segmentations of the text string to be processed, the process returns to 404 to process the next segmentation. Once all the segmentations of the text string have been considered, at 414, a set of linked entities are determined for the text string.

Figure 5:
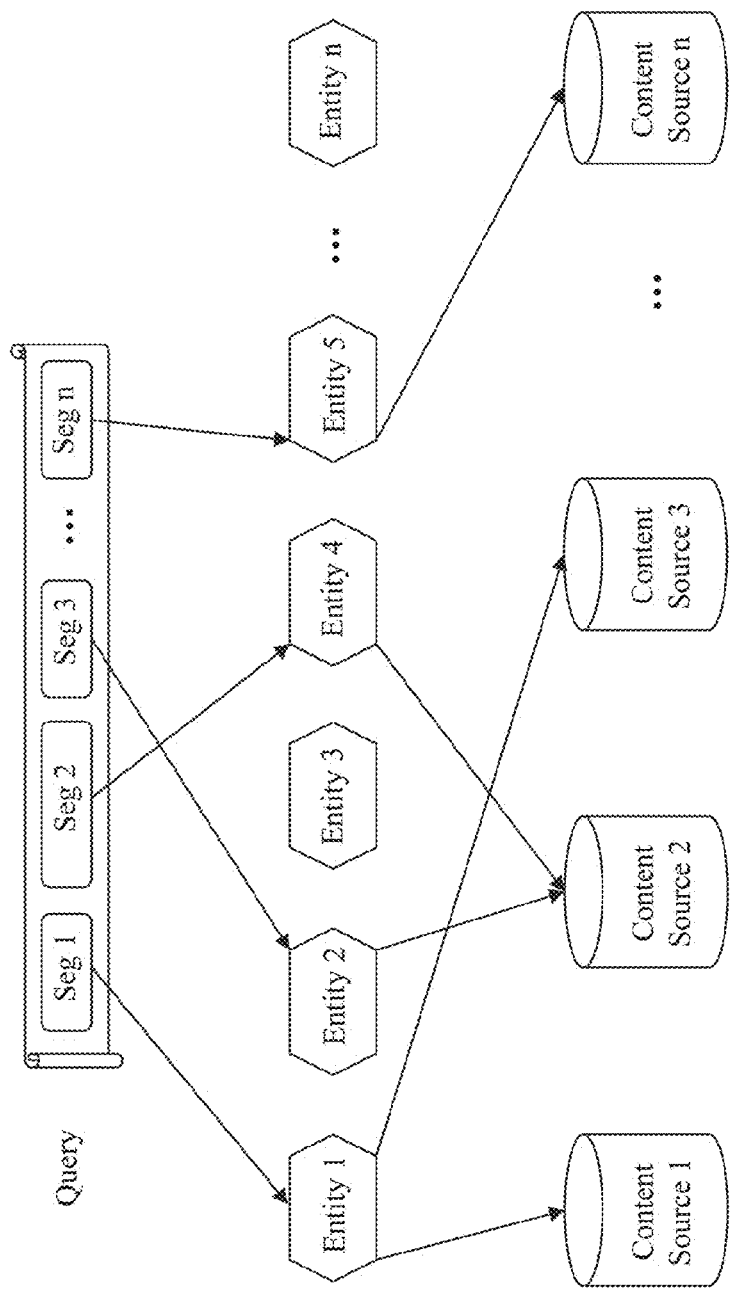
FIG. 5 depicts an exemplary application of entity linking in online search, according to an embodiment of the present teaching.

FIG. 5 depicts an exemplary application for entity linking in online search, according to an embodiment of the present teaching. In this example, a query is first segmented into multiple segments Seg 1, Seg 2, . . . Seg n. By the entity linking engine 300, each of the segments Seg 1, Seg 2, .. . Seg n is linked to one of the known entities 1-n. For example, a query of "buy iphone 6" may be segmented into Seg 1="buy" and Seg 2="iphone 6." Seg 1 "buy" may be linked to Entity 1 "Purchase," and Seg 2 "iphone 6" may be linked to Entity 4 "iPhone." It is understood that in some embodiments, only one of the segments has its linked entity identified. For example, only Entity 4"iPhone" may be identified for Seg 2 "iphone 6" if the entity linking engine 300 determines that Entity 4 "iPhone" is ranked higher than Entity 1 "Purchase." The content retrieval scoping engine 301 then identifies, for each linked entity, one or more content sources where content related to the text string can be retrieved. For example, for Entity 1 "Purchase," both the content source 1 (product review database) and content source 3 (product price database) may be identified as relevant; for Entity 4 "iPhone," the content source 2 (hardware specification database) may be identified for retrieving content, such as the specification of iPhones. The output may be used, for example, in vertical search, which can return more relevant and focused search results as the linked entities better reflect the user's search intent behind the query.

Figure 6:
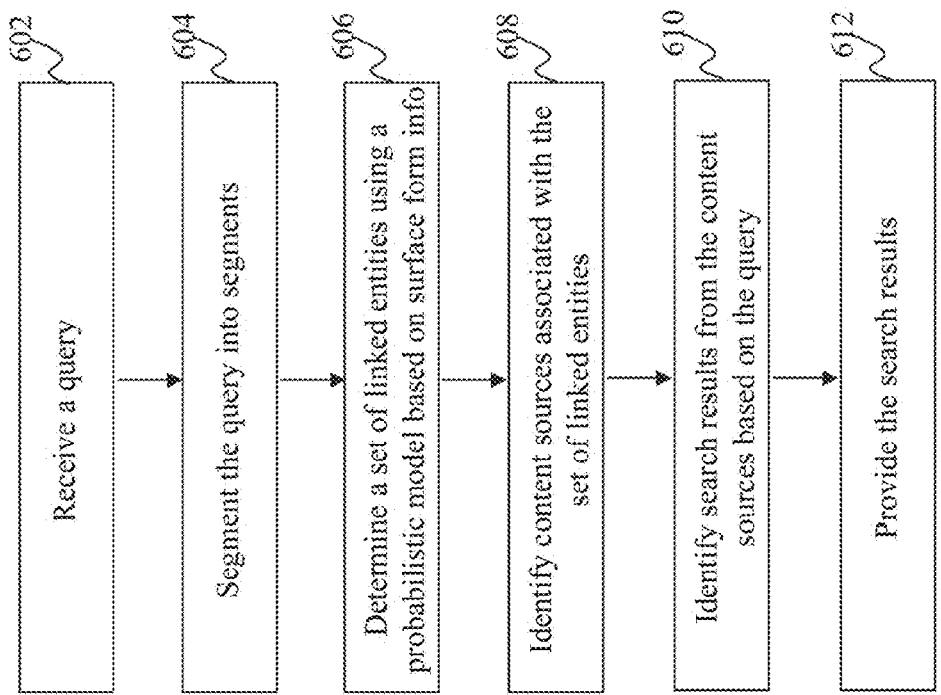
FIG. 6 is a flowchart of an exemplary process for providing query search results based on entity linking, according to an embodiment of the present teaching.

FIG. 6 is a flowchart of an exemplary process for providing query search results based on entity linking, according to an embodiment of the present teaching. Starting at 602, a query is received. At 604, the query is segmented into query segments. At 606, a set of linked entities with respect to the query segments are then determined from a collection of entities using a probabilistic model based on surface form information associated with the collection of entities. At 608, content sources associated with the set of linked entities are identified. At 610, search results are identified from the content sources based on the received query. For example, vertical search is performed for the received query in each of the identified content sources. At 612, the search results are provided as a response to the query.

Figure 7:
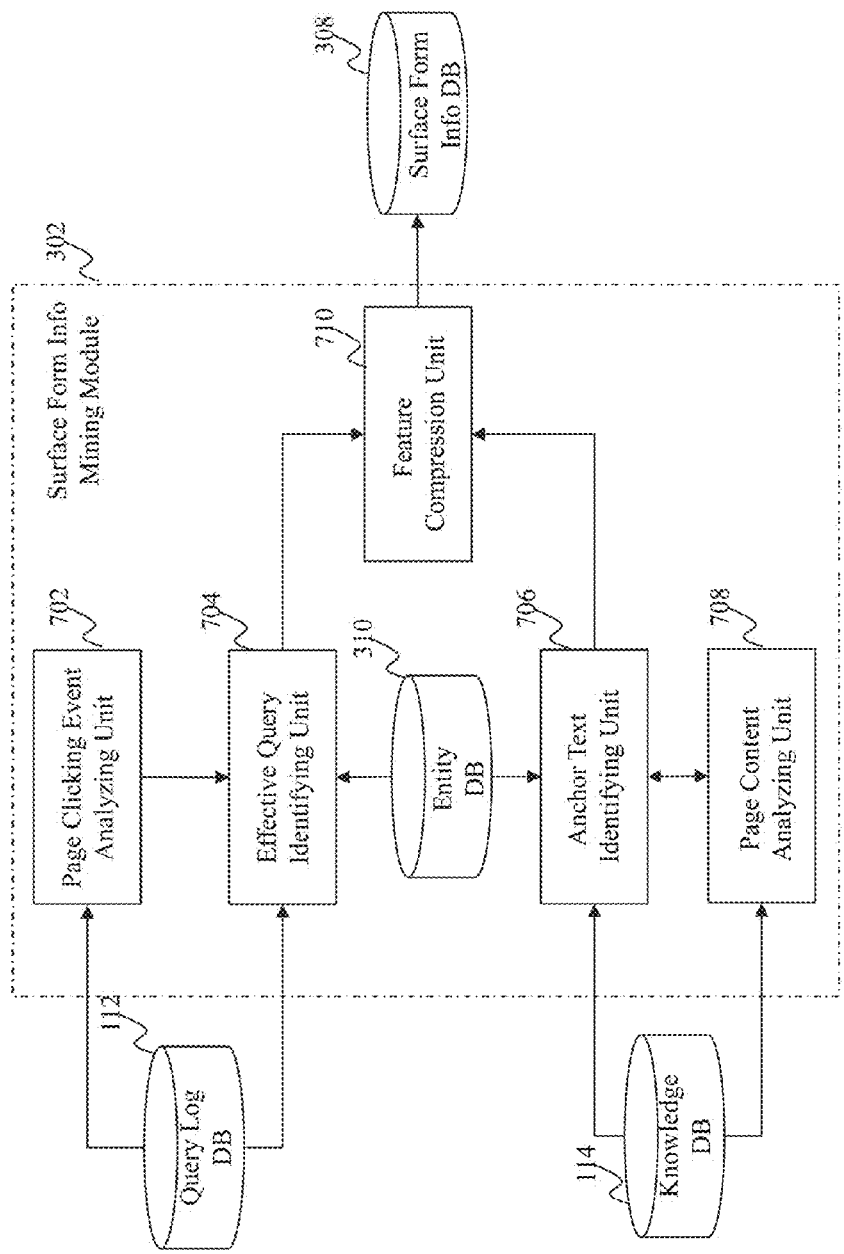
FIG. 7 is an exemplary system diagram of a surface form information mining module, according to an embodiment of the present teaching.

FIG. 7 is an exemplary system diagram of a surface form information mining module, according to an embodiment of the present teaching. In this embodiment, the surface form information mining module 302 mines data from the query log database 112 and the knowledge database 114 and generates information related to the surface forms for each entity stored in the entity database 310. The surface form information mining module 302 in this embodiment includes a page clicking event analyzing unit 702, an effective query identifying unit 704, an anchor text identifying unit 706, a page content analyzing unit 708, and a feature compression unit 710.

The page clicking event analyzing unit 702 retrieves all the user clicking events that have led to opening of any web page representing an entity in the entity database 310. The effective query identifying unit 704 identifies all the user-submitted queries that are associated with those clicking events retrieved by the page clicking event analyzing unit 702 and then associates them with the corresponding entities. For example, the user-submitted query of "the first president of usa" may be identified as an effective query because it has led to the click of the Wikipedia page of "George Washington." The query is then identified as a surface form of the entity "George Washington." On the other hand, the anchor text identifying unit 706 may identify all the hypertext within the knowledge database 114 (e.g., all the Wikipedia pages) that links to the page of an entity within the knowledge database. For example, the hypertext "George Washington" on the Wikipedia page of "List of Presidents of the United States" links to the Wikipedia page of "George Washington," and thus, is identified as another surface form of the entity "George Washington." The page content analyzing unit 708 may be configured to performance semantic analysis of content on each page of the knowledge database 114 in order to identify whether it is associated with an entity in the entity database 310. In some embodiments, the data structure used to hold the surface form information identified by the effective query identifying unit 704 and/or the anchor text identifying unit 706 may be compressed by the feature compression unit 710 to reduce the storage size and/or reduce the execution time. The details of the feature compression will be described later. In any event, the compressed or uncompressed surface form information is stored in the surface form information database 308 for future use.

Figure 8:
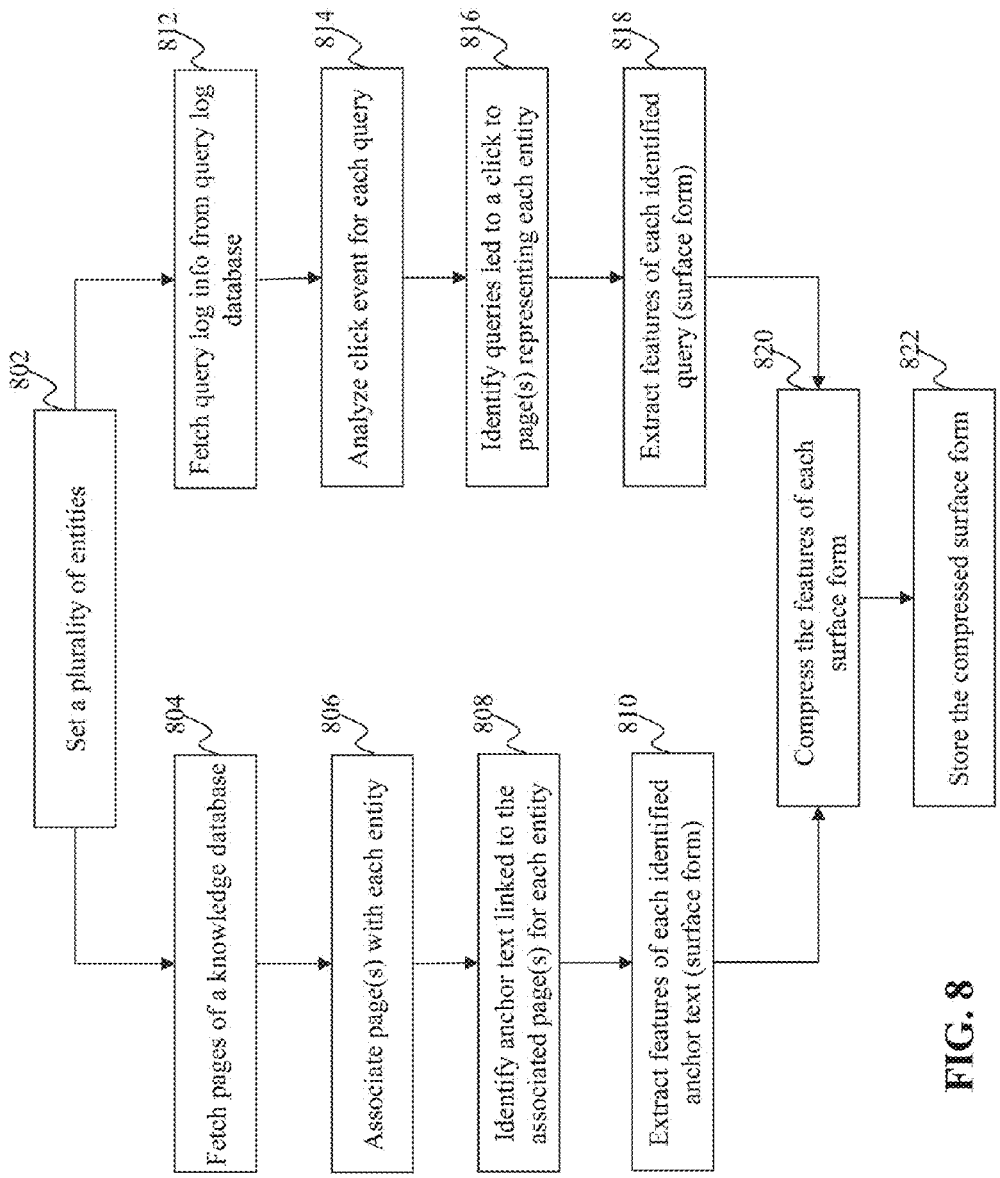
FIG. 8 is a flowchart of an exemplary process for a surface form information mining module, according to an embodiment of the present teaching.

FIG. 8 is a flowchart of an exemplary process for a surface form information mining module, according to an embodiment of the present teaching. Starting at 802, a plurality of entities are set. The entities may be manually set by editors or automatically or semi-automatically mined by any known data mining approaches. At 804, pages of a knowledge database are fetched. The knowledge database may be a general entity repository, such as Wikipedia, or a specialized entity repository, such as IMDB.com for movies and actors and Amazon.com for products. At 806, page(s) that can represent an entity are associated with the entity. At 808, anchor text linked to the associated page(s) for each entity is identified as one type of surface forms. At 810, features of each identified anchor text, such as the number of times that the anchor text is found in the knowledge database, are extracted as part of the surface form information. On the other hand, at 812, query log information is fetched from a query log database. At 814, user actions, such as clicking events, are analyzed for each user-submitted query. At 816, the queries that have led to a click to any web page representing an entity (i.e., effective queries) are identified. At 818, features of each identified effective queries, such as the number of times that the query is submitted and results in a click, are extracted as part of the surface form information. At 820, the features of each surface form are compressed. At 822, the compressed surface form information is stored for future use.

Figure 9:
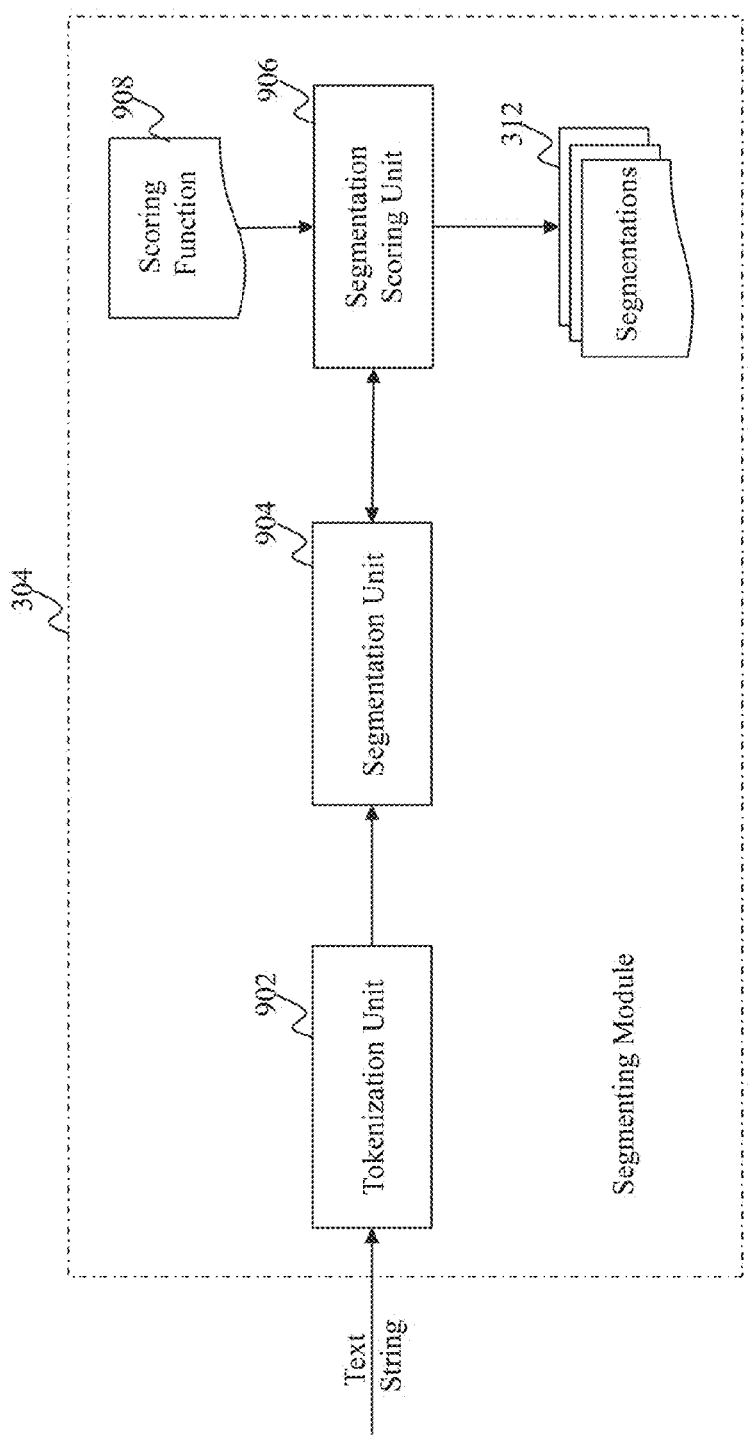
FIG. 9 is an exemplary system diagram of a segmenting module, according to an embodiment of the present teaching.
Figure 10:
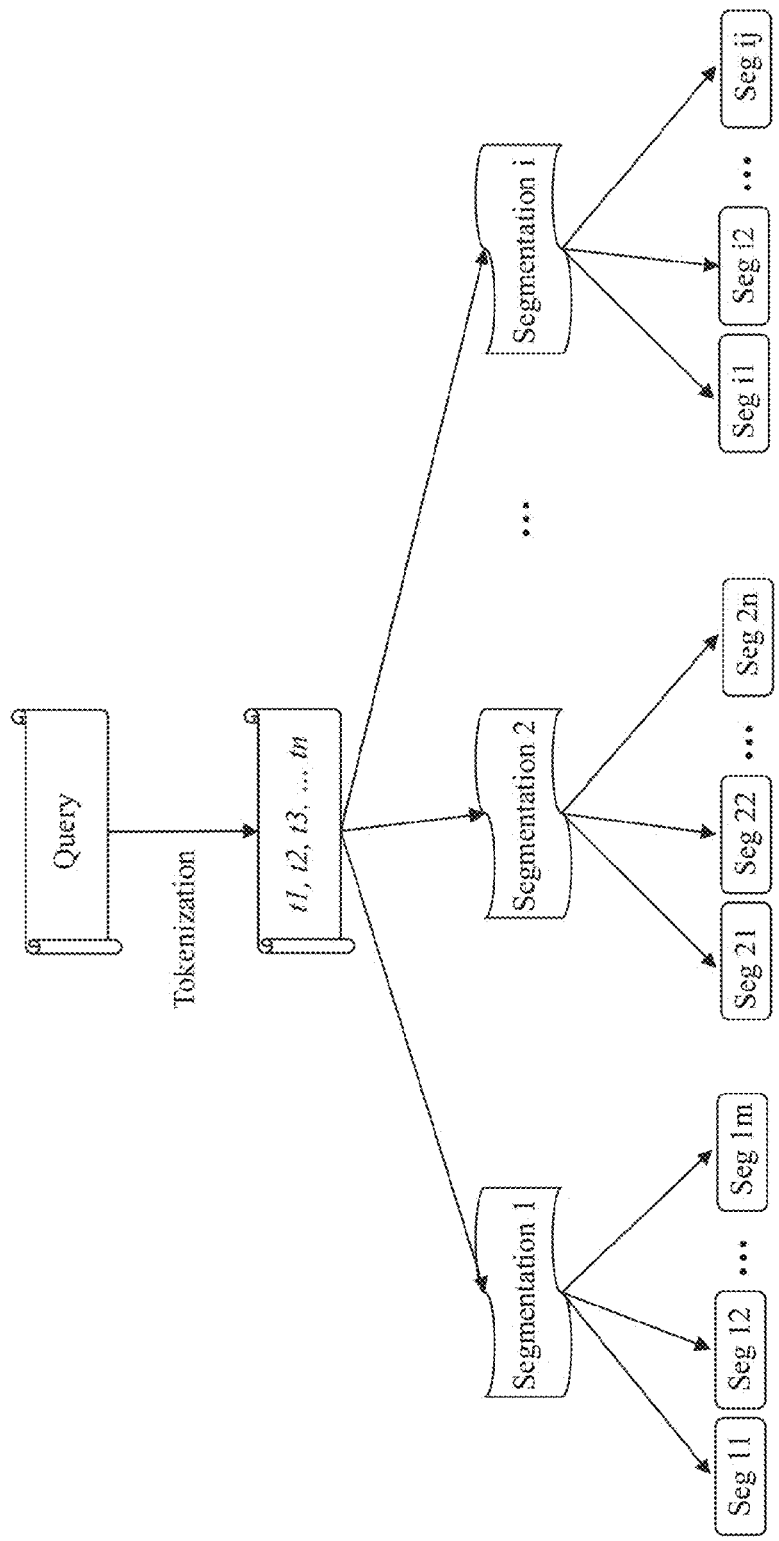
FIG. 10 depicts an exemplary query segmentation process, according to an embodiment of the present teaching.

FIG. 9 is an exemplary system diagram of a segmenting module, according to an embodiment of the present teaching. The segmenting module 304 in this embodiment includes a tokenization unit 902, a segmentation unit 904, and a segmentation scoring unit 906. The tokenization unit 902 is responsible for tokenizing the received text string. For example, as shown in FIG. 10, a query is first tokenized to generate a series of tokens $t1, t2, \ldots tn$. Punctuations, such as comma, may be removed from the text string during tokenization, and each token may be a single term or n-gram. The segmentation unit 904 is responsible for generating all possible segmentations 312 based on the tokens. As shown in FIG. 10, based on the tokens $t1, t2, \ldots tn$, all possible segmentations 1-i of the query are obtained. Each segmentation results in a set of query segments as shown in FIG. 10. The segmentation scoring unit 906 in this embodiment may compute a score for each segmentation based on a scoring function 908, for example, by a dynamic programming approach as will be described later in details.

Figure 11:
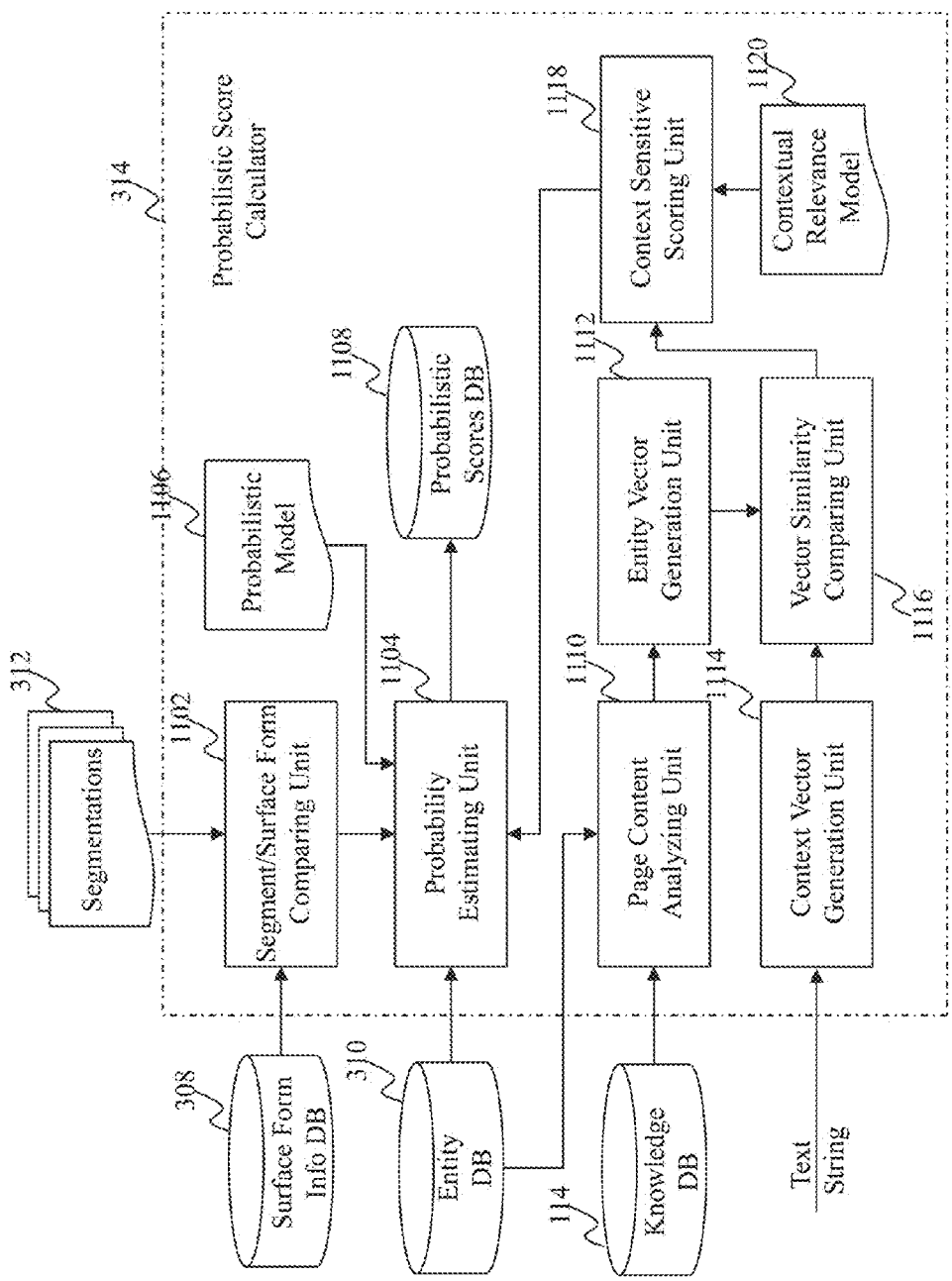
FIG. 11 is an exemplary system diagram of a probabilistic score calculator, according to an embodiment of the present teaching.

FIG. 11 is an exemplary system diagram of a probabilistic score calculator, according to an embodiment of the present teaching. The probabilistic score calculator 314 in this embodiment includes a segment/surface form comparing unit 1102 and a probability estimating unit 1104 for calculating basic probabilistic scores. The segment/surface form comparing unit 1102 retrieves the surface form information of each entity from the surface form information database 308 and compares each surface form of an entity with each segment of the received text string with a segmentation 312. The segment/surface form comparing unit 1102 counts the number of times that each segment of the text string matches with any surface form of an entity. The counts are sent to the probability estimating unit 1104 for computing the basic probabilistic score $P(e|s)$ for the segment with respect to each entity in accordance with a probabilistic model 1106. The basic probabilistic score $P(e|s)$ is indicative of a likelihood that entity e is a linked entity given segment s. The probabilistic scores for each segment with respect to each entity are stored in the probabilistic scores database 1108.

The basic probabilistic scores as mentioned above are computed independently of the context of the text string as a design choice to enable a fast chunking algorithm. However, the context of the text string can significantly help to disambiguate the candidate entities. For example, a user submitting the query "Hollywood lyrics" is probably interested in the song rather than the place; if the only matching surface form is Hollywood, the entity linking engine 300 may not be able to disambiguate the two candidates. Thus, in this embodiment, the probabilistic score calculator 314 further includes units for calculating context sensitive scores for each entity with respect to the context of each received text string. Those units include a page content analyzing unit 1110, an entity vector generation unit 1112, a context vector generation 1114, and a vector similarity comparing unit 1116.

The page content analyzing unit 1110 may perform semantic analysis on content of each page within the knowledge database 114 that represents an entity in the entity database 310. In one example, the page content analyzing unit 1110 may take the first paragraph of the Wikipedia page of each entity and generate the vector representations of the words in the paragraph. The entity vector generation unit 1112 then may generate an entity vector based on the vector representations of the words in the paragraph. As will be described later in details, the entity vector may be generated by a logistic regression classifier or computed as the centroid of the vector representations of the words. On the other hand, the context vector generation unit 1114 generates a context vector for the text string. In one example, the context of the received text string is all the words of the text string, and the context vector generation unit 1114 may generate the context vector based on the vector representations of all the words in the text string. The context vector may be generated by a logistic regression classifier or computed as the centroid of the vector representations of the words. Both the entity vector and context vector may have the same dimensionality and can be compared directly in the common feature space. The vector similarity comparing unit 1116 then determines the similarity between each entity and the context of the text string by measuring the distance (e.g., cosine distance) between each entity vector and the context vector. The context sensitive scoring unit 1118 then calculates the context sensitive probabilistic score of each entity with respect to the context of the text string based on a contextual relevance model 1120. The context sensitive probabilistic scores may be fed into the probability estimating unit 1104 to adjust the basic probabilistic scores. The adjusted scores may be stored in the probabilistic scores database 1108 as well.

Figure 12:
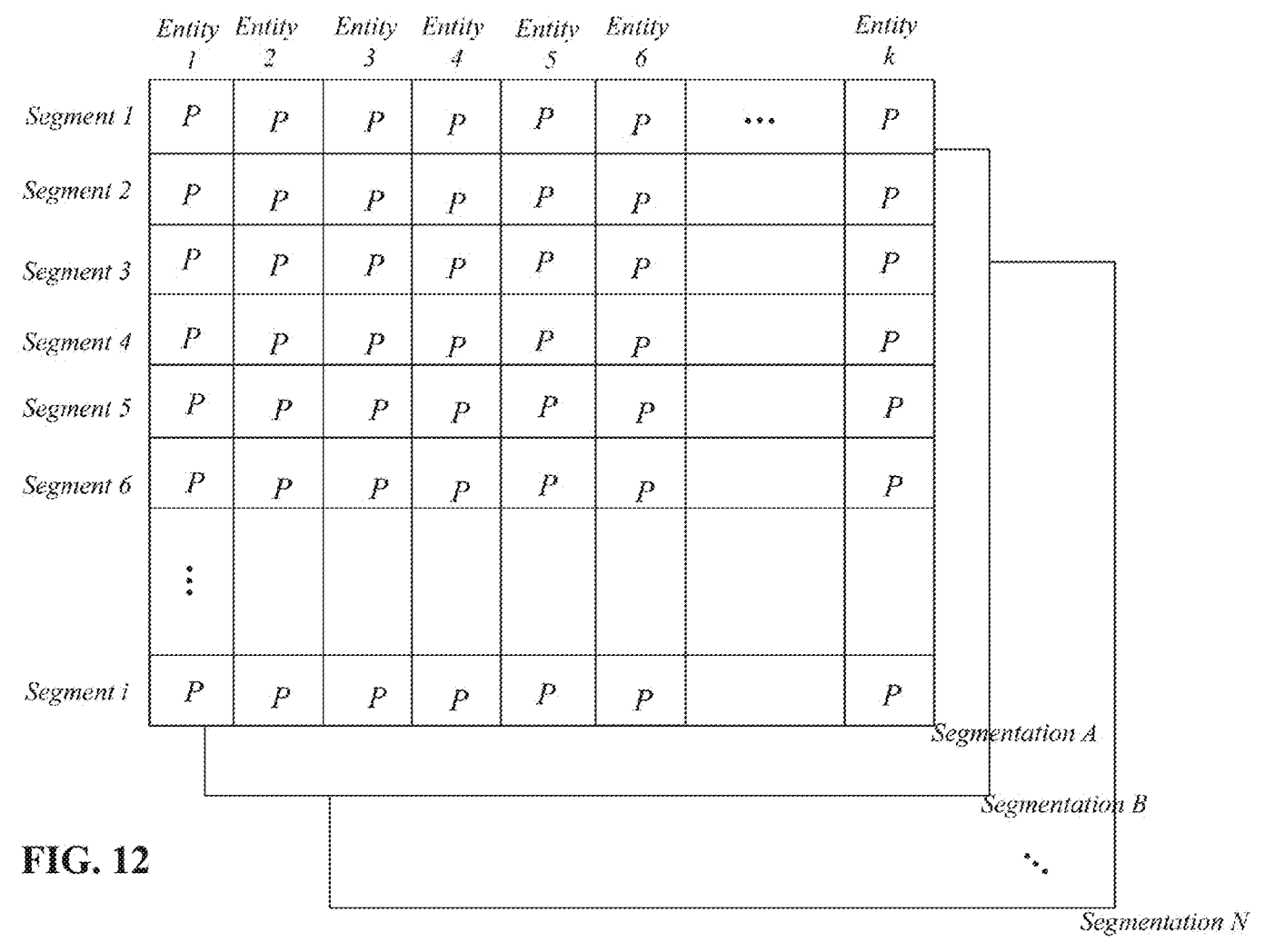

FIG. 12 depicts exemplary tables of probabilistic scores, according to an embodiment of the present teaching. As shown in FIG. 12, multiple tables may be stored in the probabilistic scores database 1108, each of which corresponds to a set of segments 1-i in one of the possible segmentations A-N of the text string. In each table, each row represents one segment of the text string, and each column represents one entity. The probabilistic scores of each entity given a segment are listed in the table. In some embodiments, the adjusted probabilistic scores of each entity given a segment and the context of the text string are listed in the table.

Figure 13:
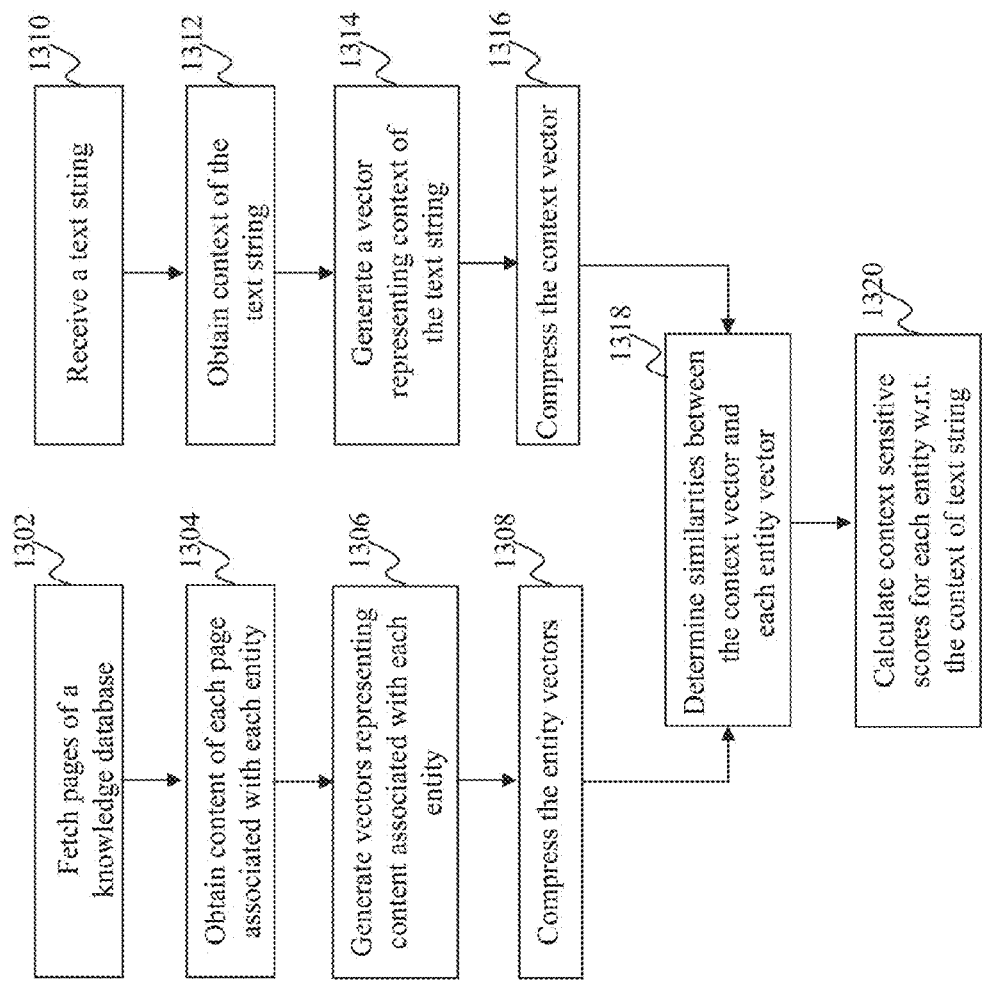
FIG. 13 is a flowchart of an exemplary process for a probabilistic score calculator, according to an embodiment of the present teaching.

FIG. 13 is a flowchart of an exemplary process for a probabilistic score calculator, according to an embodiment of the present teaching. In this embodiment, context sensitive probabilistic scores are calculated for each entity with respect to the context of a text string. Starting at 1302, pages of a knowledge database are fetched. At 1304, content of each page that represents an entity is obtained. At 1306, vectors representing content associated with each entity are generated. Optionally, the entity vectors may be compressed to reduce storage space and/or execution time at 1308. The details of vector compression will be described later. On the other hand, a text string is received at 1310. At 1312, context of the text string is obtained. At 1314, a vector representing the context of the text string is generated. Optionally, at 1316, the context vector may be compressed as well. At 1318, similarities between the context vector and each entity vector are determined, for example, by measuring the distances between the context vector and each entity vector. At 1320, context sensitive probabilistic scores of each entity with respect to the context of the text string are calculated.

Figure 14:
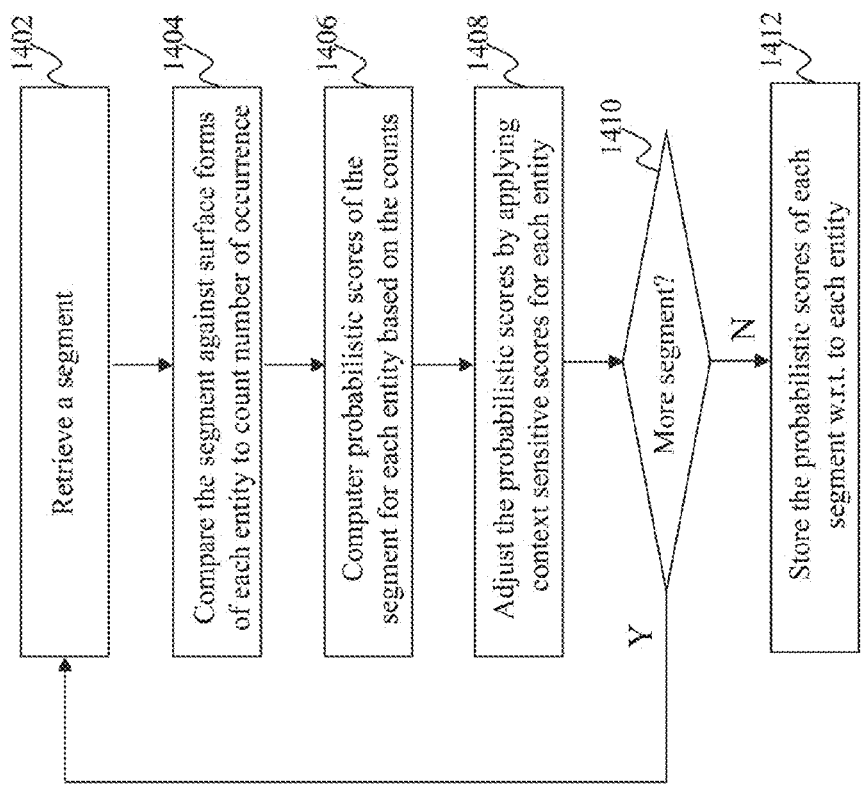
FIG. 14 is a flowchart of another exemplary process for a probabilistic score calculator, according to an embodiment of the present teaching.

FIG. 14 is a flowchart of another exemplary process for a probabilistic score calculator, according to an embodiment of the present teaching. Starting at 1402, a segment of a text string is retrieved. At 1404, the segment is compared against surface forms of each entity to count the number of times that the segment matches with any surface form. At 1406, probabilistic scores of the segment for each entity are computed based on the counts. The probabilistic score is indicative of a likelihood that an entity is a linked entity given a segment. At 1408, the probabilistic scores are adjusted by applying the context sensitive probabilistic scores for each entity with respect to the context of the text string as calculated in FIG. 13. At 1410, whether there are more segments for which their probabilistic scores have not been computed yet is determined. If the answer is yes, then the process returns to 1402 to compute the probabilistic scores of the next segment with respect to each entity. Once the probabilistic scores of all the segments are computed, the process continues to 1412 where the probabilistic scores of each segment with respect to each entity are stored.

Figure 15:
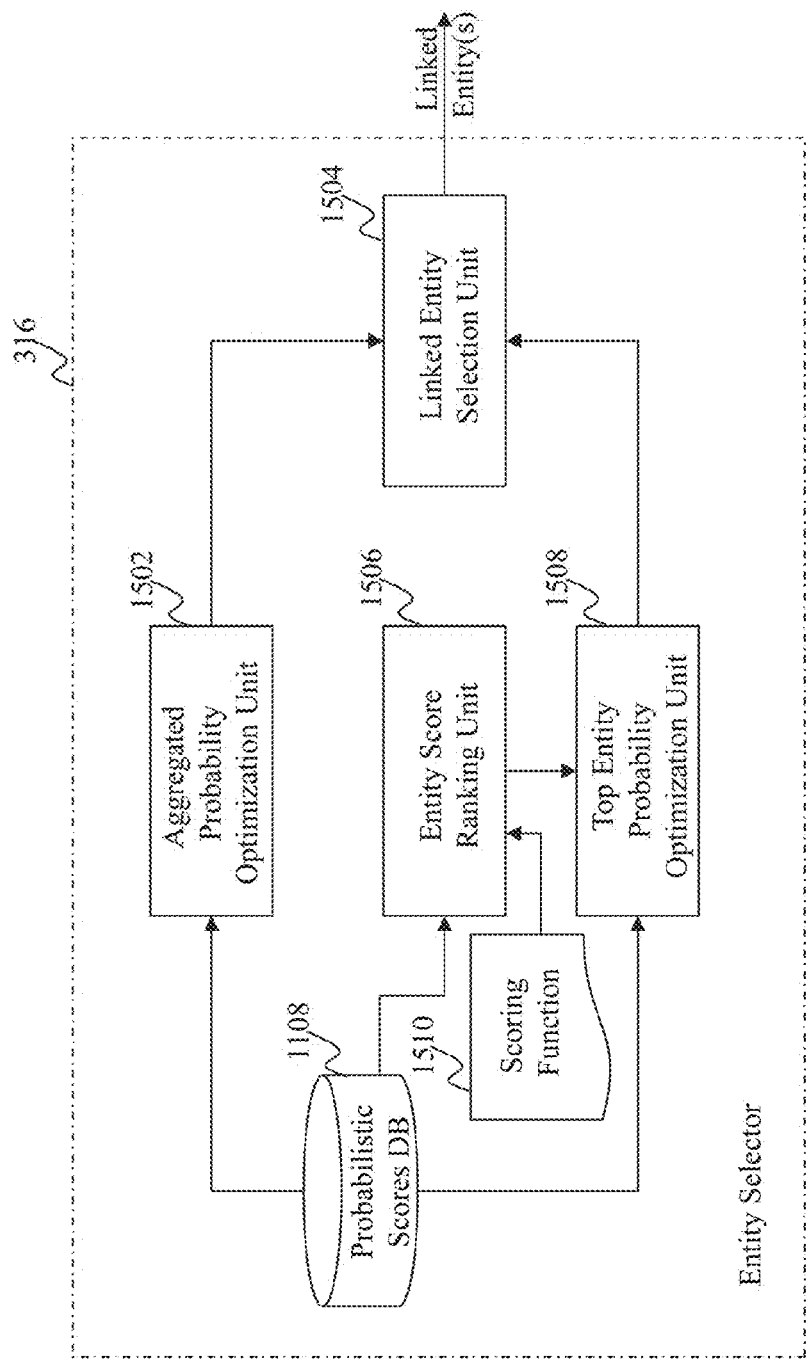
FIG. 15 is an exemplary system diagram of an entity selector, according to an embodiment of the present teaching.

FIG. 15 is an exemplary system diagram of an entity selector, according to an embodiment of the present teaching. In one embodiment, the entity selector 316 includes an aggregated probability optimization unit 1502 and a linked entity selection unit 1504. The aggregated probability optimization unit 1502 retrieves the corresponding probabilistic scores for all the segments stored in the probabilistic scores database 1108 and tries to maximize the sum of those probabilistic scores. The set of entities that maximize the aggregated probability of all segments are selected by the linked entity selection unit 1504 as the linked entities of the received text string.

In another embodiment, instead of maximizing the aggregated probabilistic scores of all segments, the entity selector 316 may select the segmentation that optimizes the score of the top-ranked entity. The entity selector 316 may include an entity score ranking unit 1506 and a top entity probability optimization unit 1508. The entity score ranking unit 1506 may rank the entities based on a scoring function 1510. The top entity probability optimization unit 1508 then tries to maximize the probabilistic score of the segment corresponding to the top-ranked entity. The set of entities that maximize the probability of the top-ranked entity are selected by the linked entity selection unit 1504 as the linked entities of the received text string.

Figure 16:
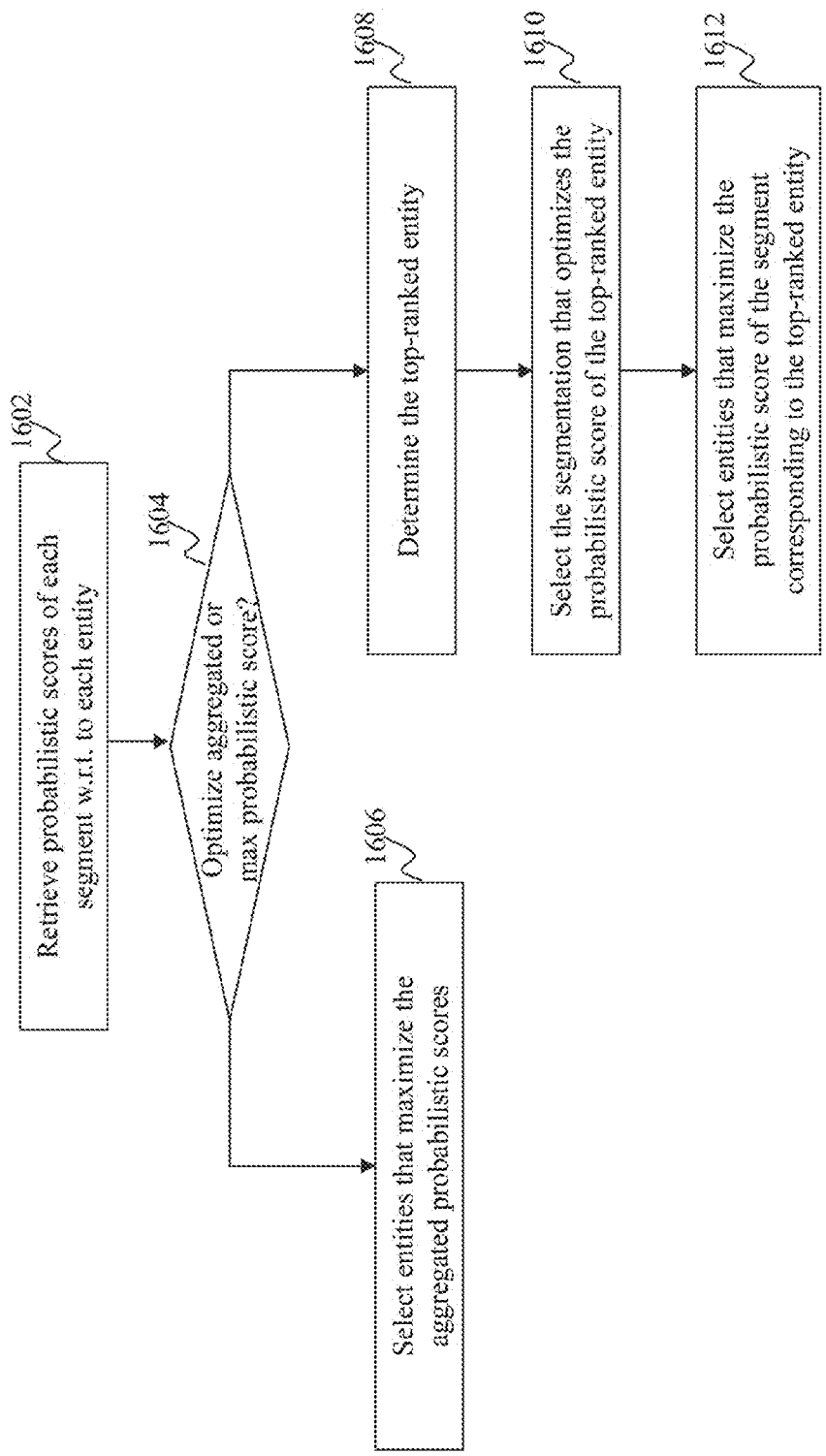
FIG. 16 is a flowchart of an exemplary process for an entity selector, according to an embodiment of the present teaching.

FIG. 16 is a flowchart of an exemplary process for an entity selector, according to an embodiment of the present teaching. Starting at 1602, probabilistic scores of each segment with respect to each entity are retrieved. At 1604, whether the optimization is based on the aggregated or maximum probabilistic scores is determined. If the optimization is based on the aggregated probabilistic scores, then at 1606, entities that maximize the aggregated probabilistic scores are selected. Otherwise, at 1608, the top-ranked entity is determined. At 1610, the segmentation that optimizes the probabilistic score of the top-ranked entity is selected. At 1612, entities that maximize the probabilistic score of the segment in the selected segmentation that corresponds to the top-ranked entity are selected.

Some examples the probabilistic model and the method and system for entity linking in the present teaching are described below in details. To describe the probabilistic model, the following random variables are introduced, assuming as an event space S×E where S is the set of all sequences and E the set of all entities known to the system. More concretely, s represents a sequence of terms s∈S drawn from the set S, s~Multinomial ($\theta_s$)

e represents a set of entities e∈e, where each e is drawn from the set E, e~Multinomial ($\theta_e$)

$a_s$~Bernoulli ($\theta_a^s$) indicates if s is a surface form $a_{s,e} \sim \text{Bernoulli}(\theta_a^{s,e})$ indicates if s is a surface form pointing (linking/clicked) to e c indicates which collection acts as a source of information query log or Wikipedia ($c_q$ or $c_w$)

n (s,c) is the count of s in c n (e,c) is the count of e in c

Let q be the input query, and the set $S_q$ represent all possible segmentations of its tokens $t_1 \cdot t_k$. The entity linking engine 300 and the method thereof will return the set of entities e, along with their scores, that maximizes $$\underset{e \in E}{\text{argmax}} \log P(e \mid q) = \underset{e \in E, s \in S_q}{\text{argmax}} \sum_{e \in e} \log P(e \mid s) \tag{1}$$

$$\text{s.t. } s \in s, \bigcup_s \subseteq s, \bigcap_s = \emptyset \tag{2}$$

Equation (1) assumes the independence of the entities e given a query segment s, and Equation (2) imposes that the segmentations are disjoint. Each individual entity/segment probability is estimated as follows:

$$P(e \mid s) = \sum_{c \in \{c_q, c_w\}} P(c \mid s) P(e \mid c, s) \tag{3}$$

$$= \sum_{c \in \{c_q, c_w\}} P(c \mid s) \sum_{a_s = \{0,1\}} P(a_s \mid c, s) P(e \mid a_s, c, s)$$

$$= \sum_{c \in \{c_q, c_w\}} P(c \mid s)[P(a_s = 0 \mid c, s) P(e \mid a_s = 0, c, s) + \tag{4}$$

$$P(a_s = 1 \mid c, s) P(e \mid a_s = 1, c, s)]$$

The maximum likelihood probabilities are (note that in this case $P(e \mid a_s = 0, c, s) = 0$ and therefore the right hand side of the summation cancels out):

$$P(c \mid s) = \frac{n(s, c)}{\sum_{c'} n(s, c)} \tag{5}$$

$$P(a_s = 1 \mid c, s) = \frac{\sum s: a_{s=1} n(s, c)}{n(s, c)} \tag{6}$$

$$P(e \mid a_s = 1, c, s) = \frac{\sum s: a_{s,e=1} n(s, c)}{\sum s: a_{s=1} n(s, c)} \tag{7}$$

Those maximum likelihood probabilities can be smoothed appropriately using an entity prior. Using Dirichlet priors smoothing the probability results in:

$$P(e \mid c) = \frac{n(e, c)}{|E| + \sum_{e \in E} n(e, c)} \tag{8}$$

$$P(e \mid a_s, c, s) = \frac{\sum s: a_{s,e=1} n(s, c) + \mu_c \cdot p(e \mid c)}{\mu_c + \sum s: a_{s=1} n(s, c)} \tag{9}$$

In this case $P(e \mid c) = P(e \mid a_s = 0, c, s)$ and $P(a_s = 0 \mid c, s) = 1 - P(a_s = 1 \mid c, s)$. Similarly, $P(c \mid s)$ can be smoothed using Laplace smoothing (add-one smoothing).

Equation (1) may be applied by the aggregated probability optimization unit 1502 to select linked entity by maximizing the sum of probabilities of all query segments. An alternative to Equation (1) would be to select the segmentation that optimizes the score of the top-ranked entity, which can be applied by the top entity probability optimization unit 1508:

$$\underset{e \in E, s \in S_q}{\text{argmax}} \; \underset{e \in e, s \in s}{\max} P(e \mid s) \tag{10}$$

Top-k entities can be ranked by iteratively removing the segments corresponding to the k-1 entities from $S_q$ and computing the argmax in Equation (10) again. Both Equations (1) and (10) are instances of the same general segmentation problem, defined as follows. Given a sequence of terms t=t1, t2, t3 . . . tk, denote any segment of the sequence with $[t_i t_{i+1} \ldots t_{i+j-1}] \forall i, j \geq 0$. Let $\gamma(s)$ be any scoring function that maps segments to real numbers, then the maximum score of a segmentation is defined as follows:

$$m(t_1, t_2, \ldots, t_k) = \tag{11}$$

$$\max((\phi(m(t_1), m(t_2, \ldots, t_k)), \phi(\gamma([t_1 t_2]), m(t_3 \ldots t_k)), \ldots ,$$

$$\phi(\gamma([t_1 \ldots, t_{k-1}]), m(t_k)), \gamma([t_1 \ldots t_k]))$$

where $m(t_1) = \gamma([t_1])$ and $\phi(a, b)$ is an associative aggregation function, such as $\phi(a, b) = a + b$ in the case of Equation (1) and $\phi(a, b) = \max(a, b)$ in the case of Equation (10). Since the scoring function $s(\cdot)$ only depends on the given segment and not on the others, the segmentation with maximum score can be computed in $O(k^2)$ time with a standard dynamic programming approach.

TABLE 1

Exemplary entity-linking algorithm

Require: A user query q, a function HIGHESTSCORE(•), and an
aggregation function $\phi$ (•,•).
1:   p ← TOKENIZE(q)
2:   l ← LENGTH(p)
3:   maxscore[] ← new array[l + 1]
4:   previous[] ← new array[l + 1]
5:   for i = 0 to l do
6:       for j = 0 to i do
7:           score ← (maxscore[j], HIGHESTSCORE(p[j : i], q))
8:           if score > maxscore[i] then
9:               maxscore[i] ← score
10:              previous[i] ← j
11:          end if
12:      end for
13:  end for
14:  return The above problem can be instantiated with the scoring function $$\gamma(s) = HIGHESTSCORE(s, q) = \max_{s \in E} \log P(e \mid s, t),$$

that, given a segment s of the query and a context t (e.g., the query itself q), returns the highest score among the entities associated with the surface form s; when the segment does not match any surface form, and hence it has no associated entities, it returns a value that is an identity for the aggregation function $\phi(\cdot,\cdot)$; it also returns an identity if the segment is empty. In the embodiments where the context is ignored, P(e|s, t) is just P(e|s).

TABLE 1 shows an exemplary algorithm that computes the maximum segmentation score. The segmentation can be retrieved by following backwards the previous array starting from position 1. The algorithm makes $O(k^2)$ calls to the HIGHESTSCORE function, which is acceptable since the number of terms in a query is usually very small.

As mentioned before, to exploit the contextual information given by all the words in the query, the contextual relevance model may be introduced (e.g., the context relevance model 1120 in FIG. 11). That is, the probability that the query e is relevant to the context t, in this case the whole query q, can be estimated. This probability can be plugged into the probabilistic model in the entities scoring just by factoring it in the HIGHESTSCORE function. Only words are considered in this example, but context could be comprised of other features like n-grams, for instance.

To this aim, P(e|s, t) needs to be computed where s is the string segment and t is the context $t_1, \ldots, t_k$. Then $$P(e|s, t) = \frac{P(e)P(s, t|e)}{P(s, t)},$$

assuming independence between t and s and conditional independence given e, $$P(e|s, t) = \frac{p(e)}{p(t)p(s)} \cdot P(t|e)P(s|e),$$

which is equal to $$P(e|s)\frac{p(t|e)}{p(t)}.$$

The first factor is estimated as in Equation (3). To estimate the second factor efficiently, it is assumed again conditional independence on e and write it as $$\prod_i \frac{p(w_i|e)}{p(t)}.$$

The second factor thus can be estimated by estimating P(w|e), i.e. the probability that the term/word w is relevant to the entity e.

P(w|e) can be estimated using a multiset $R_e$ of words w that are known to be relevant to e. In some embodiments, the words in the first section of the Wikipedia page are used to represent e. One exemplary approach would be to count the number of occurrences of w, $$P(w|e) = \frac{|\{w \in R_e\}|}{|R_e|}$$

which would make me model a multi-class Naive Bayes classifier.

In another example, the known "continuous representations of words" approaches, such as the "word2vec embeddings" approach may be applied. These embeddings map words to vectors of real numbers so that words that are close in meaning are mapped to vectors close in cosine distance. The vectors are computed in an unsupervised fashion on large corpuses of text by exploiting the distributional semantics hypothesis. That is, words that co-occur often with the same words are close in meaning. $v_w \in R^D$ is denoted as the vector that represents the word w.

In one embodiment, the word vectors are used to model P(w|e) as a binary logistic regression classifier. That is, each entity e is mapped to a vector $v_w \in R^{D+1}$ and define P(w|e)= $\sigma([v_w 1] \cdot v_e)$, where $$\sigma(x) = \frac{1}{1+e^{-x}}.$$

Since to score each entity e with a query $t_1, \ldots, t_k$, it needs to compute the product of the probabilities $P(w_i|e)$, the overall complexity is O(kD) operations. In the following, this method is referred as LR.

Each classifier $v_e$ is trained with $L_2$-regularized logistic regression to distinguish the multiset $R_e$ (the positive examples) from the unigram distribution from the whole collection (the negative examples). Since this would require to train on a set of examples as large as the collection dictionary, a method known as "negative sampling" can be used. This method can also be used to train the "word2vec" vectors: ρ words are sampled from the unigram distribution as negative examples, so that the overall number of examples is bounded by $O(|R_e|)$. In conclusion, the vector $v_e$ is computed as the maximum of the function $$\sum_{w \in R_e} \log \sigma([v_w\ 1] \cdot v_e) + \sum_{w \in N_e} \log \sigma(-[v_w\ 1] \cdot v_e) - \lambda \|v_e\|_2^2 \quad (12)$$

where $N_e$ is the multiset of $\rho|R_e|$ negative samples and $\lambda$ is the regularization parameter.

The hyperparameters ρ and λ may be tuned in an unsupervised fashion. In one embodiment, an artificial task for optimizing the parameters ρ and λ is performed as follows: a set of entities $\varepsilon_{train}$ are sampled among those whose multiset $R_e$ has at least 50 words, and a subsample $\varepsilon_{test} \subset \varepsilon_{train}$ are extracted. For each entity e in $\varepsilon_{train}$, k words are held out from $R_e$, and the entity vector is trained on the remaining words. Then, for each entity e in $\varepsilon_{test}$ the k held out words are used to score all the entities in $\varepsilon_{train}$ and compute the rank of e in the induced ranking. The accuracy is then defined as the average logarithm of the ranks. In one example, the number of negative samples ρ increases the accuracy but the training time grows linearly; a satisfactory trade-off may be set at ρ=20, where the accuracy reaches a plateau. With respect to the regularization parameter λ, instead, a maximum value may be set at λ=10.

Note that he whole model consists of one vector of D numbers for each word in the dictionary and one vector of D+1 numbers for each entity in the knowledge base. Even using a 32-bit floating point number representation, the space occupancy would be 4(E(D+1)+WD), where E is the number of entities and W the number of words, regardless of the size of the sets $R_e$.

In another embodiment, an alternative approach may be applied to model the relevance of e for a query $t_1, \ldots, t_k$ by defining the entity vector $v_e$ as the centroid of the vectors representing the words in $R_e$. That is, $$v_e = \frac{1}{|Re|} \sum_{w \in Re} v_u,$$

and similarly the query vector $v_q$ as the centroid of the vectors of the words of the query, that is $$v_q = \frac{1}{k} \sum_i v_{wi},$$

and defining the relevance as the cosine $\cos(v_q, v_e)$. Aggregating the vectors of bags of words by taking their centroid is a widely used approach with continuous word representations, and it is also suggested in the known "word2vec" approach.

With the added contextual scoring HIGHESTSCORE(p[i:j], q) now return, among all the entities that match the alias p[i:j], the one that maximizes $$P(e|s)\frac{p(t|e)}{p(t)},$$

so the probability is computed for each entity. In some embodiments, the denominator P(t) can be removed from the computation, since it does not depend on the entity. Then, the score to be computed becomes P(e|s)P(t|e). The first component is the basic probabilistic score, and the second is the contextual sensitive score.

The contextual relevance computation can be slower than the basic probabilistic score, because it involves retrieving the entity vectors from the model data structure and computing several vector-vector products. In some embodiments, as only the highest-scored entity is of interest, the number of score computations can be reduced by early-stopping the process in a safe way. For example, noting that P(t|e) is at most 1; hence, if e* is the top-scoring entity and e a candidate entity, and if P(e|s)<P(e*|s)P(t|e*) then a fortiori the full score of e cannot be higher than that of e*. Thus, the entities can be sorted by decreasing score P(e|s) and stop computing the contextual relevance score as soon as P(e|s) is smaller than the full score of the current top-scoring entity.

As mentioned before, the vectors representing the entities and context (e.g., continuous bags of words) may be compressed in some embodiments. In one embodiment, the data structure represents a general mapping from strings to vectors, which can be split in two parts: a mapping from n strings to numeric identifiers in [0,n), and the actual vectors, which is convenient to see as a matrix $V \in \mathbb{R}^{n \times D}$ whose rows are the vectors.

The mapping can be represented with a minimal perfect hash function, which computes the identifier of a string in constant time and guarantees that no collisions can occur between strings of the key set. Such a function can however return arbitrary values on other strings. To make the collision probability negligible a constant-sized signature may be associated to each string, so that it can be checked whether the string being looked up was present in the key set. In one example, this data structure may be used as the known signed minimal perfect hash function.

To store the matrix V, known techniques from vector quantization and signal compression may be adopted. The entries of the matrix may be quantized with a uniform dead-zone quantizer. That is, an element x is quantized as $\text{sgn}(x)\lfloor |x|/z \rfloor$ for a given quantization parameter z. The same z may be used for all the elements in the matrix, and the largest value that yields a target error bound may be selected. For example, a relative error in $L_2$ norm of the vectors of 0.1 may be used. The integers obtained from quantization are then encoded with Golomb codes. Since the columns of the matrix might have different statistics, a different Golomb modulus may be used for each column. The encodings of each vector are concatenated into a single bit stream, and their starting positions are stored in an Elias-Fano monotone sequence data structure.

As mentioned before, the features of the surface forms and entities may be compressed in some embodiments as well. In one embodiment, a compressed data structure is generated to hold the information about surface forms and entity candidates for each one of them. The numerical features that may be used by the probabilistic model in the present teaching are summarized in TABLE 2.

TABLE 2

Different features compressed in the data structure.

| | Features included for every surface form |
|---|---|
| 1 | Number of times the surface form was submitted as a query $n(s, c_q)$ |
| 2 | Number of times the surface form resulted in a click $\Sigma_{s:a=1} n(s, c_q)$ |
| 3 | Number of times the surface form was found in Wikipedia's text $n(s, c_w)$ |
| 4 | Number of times the surface form was present inside anchor text $\Sigma_{s:a=1} n(s, c_w)$ |

| | Features included for every entity |
|---|---|
| 5 | Number of times the entity's Wikipedia page was clicked after a query was submitted $n(e, c_q)$ |
| 6 | Number of times the entity's Wikipedia page was linked $n(e, c_q)$ |

| | Surface form and entity features |
|---|---|
| 7 | Number of times the surface form resulted in a click in the entity's Wikipedia page e, $\Sigma_{s:a_{s,e}=1} n(s, c_q)$ |
| 8 | Number of times the surface form occurred in an anchor pointing to the entity's Wikipedia page e, $\Sigma_{s:a_{s,e}=1} n(s, c_w)$ |

The data structure is a hash table represented as follows. Each key of the table corresponds to a different surface form (string segment that might represent one or more candidate entities). The values contained in TABLE 2 are split into two parts: entity-independent features (1-4 in TABLE 2) stored as a monotone sequence of integers, and a sequence of N entity-dependent features (5-8 in TABLE 2), one per candidate entity. For compactness, entities in TABLE 2 are represented with a numerical id although a separate identifier may be held to string map stored as a front-coded list. Integer values may be stored using Elias-Fano monotone sequences. In some embodiments, given that the number of entities is several orders of magnitude smaller than the number of surface form, the surface form-independent features (5, 6 in TABLE 2) may be stored in its own Elias-Fano list, indexed by entity id. The surface form strings are perfectly-hashed, like in the case of the word vectors described before, and an additional (compressed) list of cut pointers indicating the boundaries of the per surface form information may be held in the compressed list of values.

The method and system for entity linking in the present teaching have been compared with some known entity linking systems in terms of their performances (e.g., precision and execution time). In some experiments, the different methods and systems were evaluated using early precision metrics, i.e, Precision at rank 1(P@1), Mean Reciprocal Rank (MRR), R-Precision (R-Prec) and also Mean Average Precision (MAP). Experiment results have shown that the method and system for entity linking in the present teaching outperformed other known solutions with respect to the above-mentioned precision metrics with a large margin. The execution time of the method and system for entity linking in the present teaching is also significantly shorter than any of the known solutions.

Figure 17:
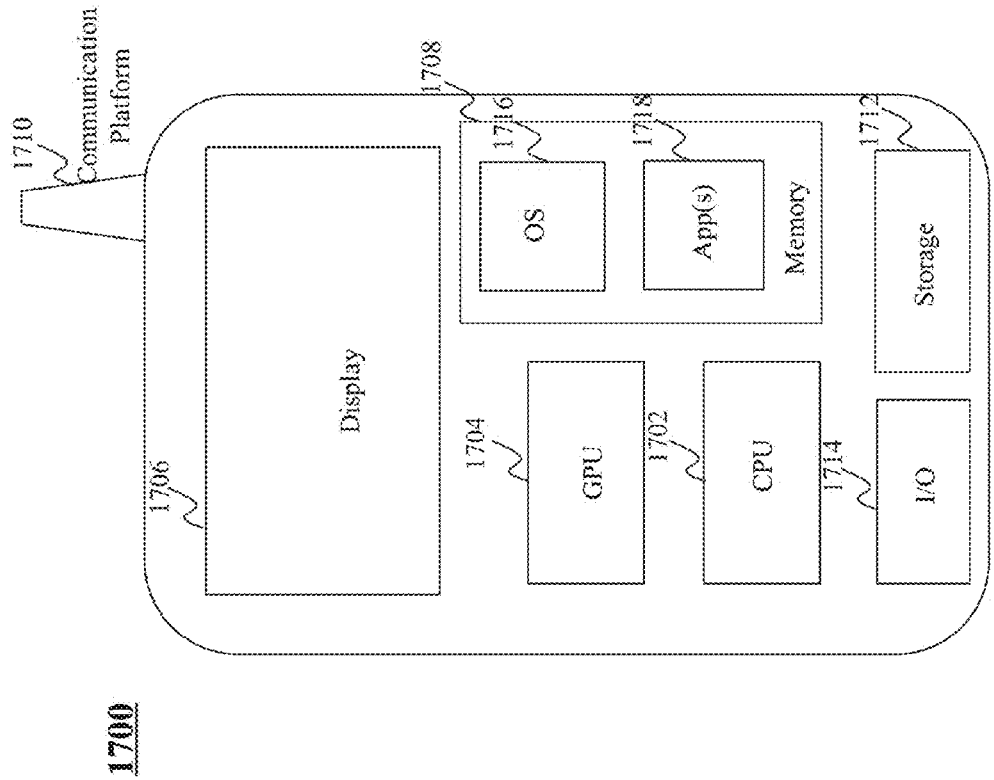
FIG. 17 depicts the architecture of a mobile device which can be used to implement a specialized system incorporating the present teaching.

FIG. 17 depicts the architecture of a mobile device which can be used to realize a specialized system implementing the present teaching. In this example, the user device on which content and query results are presented and interacted with is a mobile device 1700, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1700 in this example includes one or more central processing units (CPUs) 1702, one or more graphic processing units (GPUs) 1704, a display 1706, a memory 1708, a communication platform 1710, such as a wireless communication module, storage 1712, and one or more input/output (I/O) devices 1714. Any other suitable component, including but not limited to a system bus or a controller (not shown), may also be included in the mobile device 1700. As shown in FIG. 17, a mobile operating system 1716, e.g., iOS, Android, Windows Phone, etc., and one or more applications 1718 may be loaded into the memory 1708 from the storage 1712 in order to be executed by the CPU 1702. The applications 1718 may include a browser or any other suitable mobile apps for receiving and rendering query results on the mobile device 1700. User interactions with the content and query results may be achieved via the I/O devices 1714 and provided to the entity-based content retrieval scoping system 102 and/or the content provider 104 via communication platform 1710.

To implement various modules, units, and their functionalities described in the present disclosure, computer hardware platforms may be used as the hardware platform(s) for one or more of the elements described herein (e.g., the entity-based content retrieval scoping system 102 described with respect to FIGS. 1-16). The hardware elements, operating systems and programming languages of such computers are conventional in nature, and it is presumed that those skilled in the art are adequately familiar therewith to adapt those technologies to entity linking as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 18:
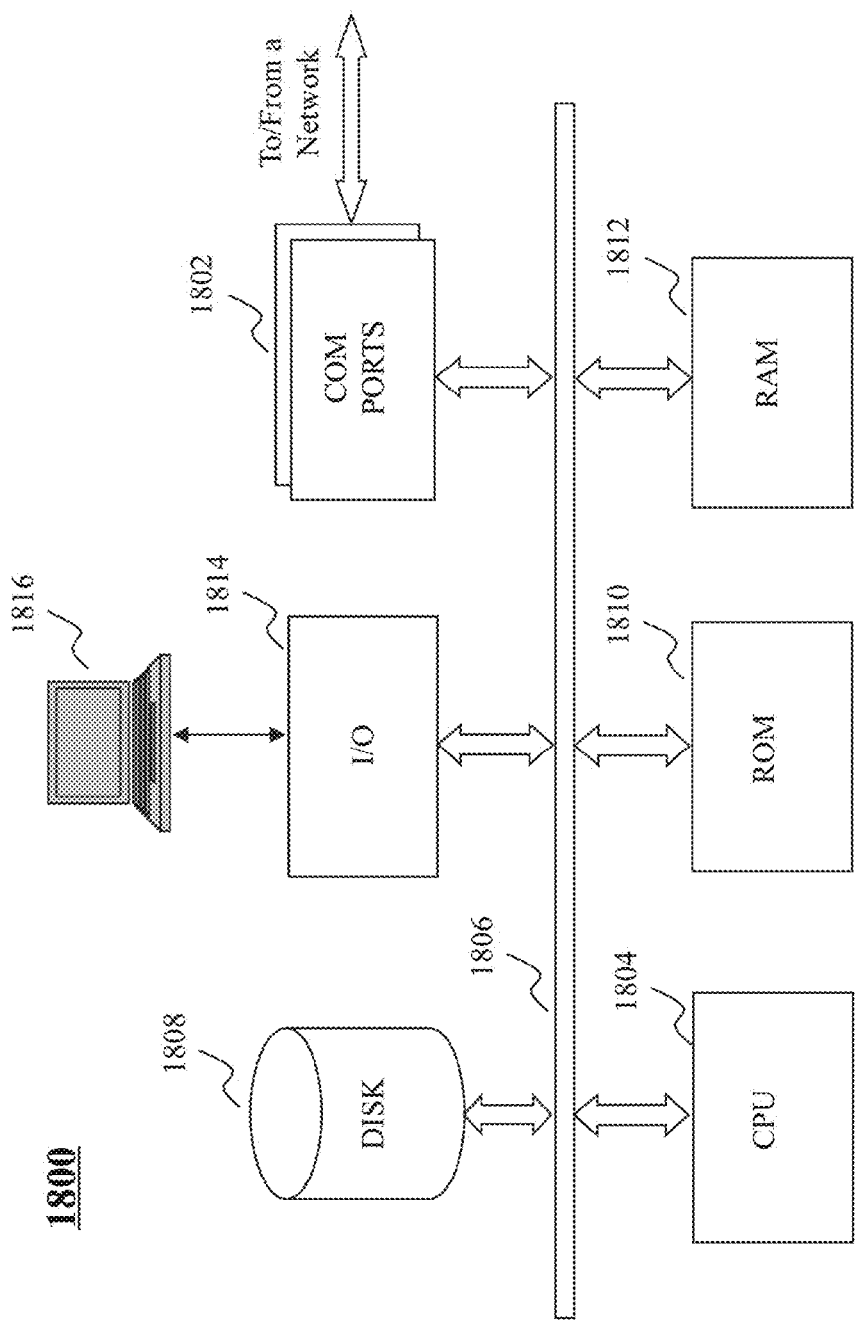
FIG. 18 depicts the architecture of a computer which can be used to implement a specialized system incorporating the present teaching.

FIG. 18 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1800 may be used to implement any component of entity linking techniques, as described herein. For example, the entity linking engine 102, etc., may be implemented on a computer such as computer 1800, via its hardware, software program, firmware, or a combination thereof. Although only one such computer is shown, for convenience, the computer functions relating to entity linking as described herein may be implemented in a distributed fashion on a number of similar platforms, to distribute the processing load.

The computer 1800, for example, includes COM ports 1802 connected to and from a network connected thereto to facilitate data communications. The computer 1800 also includes a central processing unit (CPU) 1804, in the form of one or more processors, for executing program instructions. The exemplary computer platform includes an internal communication bus 1806, program storage and data storage of different forms, e.g., disk 1808, read only memory (ROM) 1810, or random access memory (RAM) 1812, for various data files to be processed and/or communicated by the computer, as well as possibly program instructions to be executed by the CPU 1804. The computer 1800 also includes an I/O component 1814, supporting input/output flows between the computer and other components therein such as user interface elements 1816. The computer 1800 may also receive programming and data via network communications.

Hence, aspects of the methods of entity linking and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator into the hardware platform(s) of a computing environment or other system implementing a computing environment or similar functionalities in connection with entity linking. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a computing device having at least one processor, storage, and a communication platform capable of connecting to a network for entity linking, comprising:

receiving a search query, including a first text string, from a user;

segmenting the first text string to obtain a plurality of segments, wherein each of the plurality of segments is a portion of the first text string;

associating a first set of entities from a plurality of entities with one of the plurality of segments of the first text string based on a probabilistic model, the probabilistic model being based at least partially on a previously submitted search query, which includes a second text string and which led the user to Internet content affiliated with at least one entity of the first set of entities, wherein the probabilistic model is used to compute a probabilistic score for each of the plurality of entities with respect to the one segment of the first text string, and wherein the probabilistic scores are computed independently of one another; and identifying the first set of entities from the plurality of entities as linked to the one segment of the first text string based on the association.

2. The method of claim 1, wherein the probabilistic model is based on an anchor text representing a link to a web page associated with an entity.

3. The method of claim 1, wherein the step of identifying comprises:

computing, for the one segment and with respect to each of the plurality of entities, the probabilistic score $P(e|s)$ for the one segment based at least partially on the search query, wherein the probabilistic score $P(e|s)$ is indicative of a likelihood that entity e is a linked entity given segment s.

4. The method of claim 3, further comprising:

identifying a second set of entities from the plurality of entities as linked to another one segment of the plurality of segments, in accordance with the probabilistic model based at least partially on a previously submitted search query that led a user to Internet content associated with at least one entity of the second set of entities; and determining a set of linked entities based on the first set of entities and the second set of entities.

5. The method of claim 4, wherein the set of linked entities are determined by:

maximizing aggregated probabilistic scores associated with the one segment and the other one segment; or maximizing one of the probabilistic scores associated with the one segment and the other one segment.

6. The method of claim 1, wherein the identifying is based, at least in part, on context of the first text string.

7. The method of claim 6, wherein the probabilistic model includes a contextual relevance model based on which a context sensitive probabilistic score is computed for each entity; and the context sensitive probabilistic score is indicative of a likelihood that the entity is linked to a segment given the context of the first text string.

8. The method of claim 7, wherein the context sensitive probabilistic score is determined based on a similarity between a first vector representing content associated with the entity and a second vector representing the context of the first text string.

9. The method of claim 8, wherein the first vector is determined based on the content of a web page associated with the entity.

10. The method of claim 1, further comprising:

determining, based on the identified linked entities, content sources where content related to the first text string can be retrieved.

11. The method of claim 1, wherein each entity of the first set of entities is a thing that has a distinct and independent existence.

12. The system of claim 1, wherein the first set of entities are identified as linked to the one segment before retrieving content responsive to the received search query.

13. The method of claim 1, wherein the segmenting of the first text string to obtain the plurality of segments comprises:

tokenizing the first text string to generate a series of tokens;

generating a plurality of disjoint segmentations based on the series of tokens; and segmenting one of the plurality of disjoint segmentations to obtain the plurality of segments.

14. The method of claim 13, wherein the tokenizing comprises removing punctuation from the first text string, and wherein each of the tokens is a single term or n-gram.

15. The method of claim 13, wherein the generating of the plurality of disjoint segmentations comprises computation of a score for each of the segmentations based on a scoring function.

16. A method, implemented on a computing device having at least one processor, storage, and a communication platform capable of connecting to a network for providing search results, comprising:
    receiving a search query, including a first text string, from a user;
    partitioning the first text string into a plurality of segments, wherein each of the plurality of segments is a portion of the first text string;
    associating a first set of entities from a plurality of entities with one of the plurality of segments of the first text string based on a probabilistic model, the probabilistic model being based at least partially on a previously submitted search query, which includes a second text string and which led the user to Internet content affiliated with at least one entity of the first set of entities, wherein the probabilistic model is used to compute a probabilistic score for each of the plurality of entities with respect to the one segment of the first text string, and wherein the probabilistic scores are computed independently of one another;
    identifying the first set of entities from the plurality of entities as linked to the one segment of the first text string based on the association;
    identifying content sources associated with the first set of entities linked to the one segment;
    determining search results from the content sources based on the search query; and
    providing the search results as a response to the search query.

17. A system for entity linking, comprising:
    a segmenting module configured to segment a first text string received as part of a search query from a user to obtain a plurality of segments, wherein each of the plurality of segments is a portion of the first text string; and
    an entity identifying module coupled with the segmenting module and configured to associate a first set of entities from a plurality of entities with one of the plurality of segments based on a probabilistic model, the probabilistic model being based at least partially on a previously submitted search query, which includes a second text string and which led the user to Internet content affiliated with at least one entity of the first set of entities, wherein the probabilistic model is used to compute a probabilistic score for each of the plurality of entities with respect to the one segment of the first text string, and wherein the probabilistic scores are computed independently of one another, the entity identifying module being further configured to identify the first set of entities from the plurality of entities as linked to the one segment of the first text string based on the association.

18. The system of claim 17, wherein the probabilistic model is based on an anchor text representing a link to a web page associated with an entity.

19. The system of claim 17, wherein the entity identifying module comprises:
    a probabilistic score calculator configured to compute, for the one segment and with respect to each of the plurality of entities, the probabilistic score $P(e|s)$ for the one segment based at least partially on the search query, wherein the probabilistic score $P(e|s)$ is indicative of a likelihood that entity $e$ is a linked entity given segment $s$.

20. The system of claim 19, wherein
the entity identifying module is further configured to:
    identify a second set of entities from the plurality of entities as linked to another one segment of the plurality of segments, in accordance with the probabilistic model based at least partially on a previously submitted search query that led a user to Internet content associated with at least one entity of the second set of entities, and
    determine a set of linked entities based on the first set of entities and the second set of entities.

21. The system of claim 20, wherein the entity identifying module comprises an entity selector configured to:
    maximize aggregated probabilistic scores associated with the one segment and the other one segment; or
    maximize one of the probabilistic scores associated with the one segment and the other one segment.

22. The system of claim 17, wherein the identifying is based, at least in part, on context of the first text string.

23. The system of claim 22, wherein
the probabilistic model includes a contextual relevance model based on which a context sensitive probabilistic score is computed for each entity; and
the context sensitive probabilistic score is indicative of a likelihood that the entity is linked to a segment given the context of the first_text string.

24. The system of claim 23, wherein the context sensitive probabilistic score is determined based on a similarity between a first vector representing content associated with the entity and a second vector representing the context of the first text string.

25. The system of claim 24, wherein the first vector is determined based on the content of a web page associated with the entity.

26. A machine-readable, non-transitory and tangible medium having data recorded thereon for entity linking, the medium, when read by the machine, causes the machine to perform the following steps:
    receiving a first text string as part of a search query from a user;
    segmenting the first text string to obtain a plurality of segments, wherein each of the plurality of segments is a portion of the first text string;
    associating a first set of entities from a plurality of entities with one of the plurality of segments of the first text string based on a probabilistic model, the probabilistic model being based at least partially on a previously submitted search query, which includes a second text string and which led the user to Internet content affiliated with at least one entity of the first set of entities, wherein the probabilistic model is used to compute a probabilistic score for each of the plurality of entities with respect to the one segment of the first text string, and wherein the probabilistic scores are computed independently of one another; and
    identifying the first set of entities from the plurality of entities as linked to the one segment of the first text string based on the association.

27. The medium of claim 26, wherein the steps further comprise:
    identifying a second set of entities from the plurality of entities as linked to another one segment of the plurality of segments, in accordance with the probabilistic model based at least partially on a previously submitted search query that led a user to Internet content associated with at least one entity of the second set of entities; and determining a selected set of linked entities based on the first set of entities and the second set of entities.

28. The medium of claim 26, wherein each entity of the first set of entities is a thing that has a distinct and independent existence.

\* \* \* \* \*